US008828618B2

(12) United States Patent
Day et al.

(10) Patent No.: US 8,828,618 B2
(45) Date of Patent: Sep. 9, 2014

(54) HIGH PERFORMANCE MULTILAYER ELECTRODES FOR USE IN REDUCING GASES

(75) Inventors: Michael J. Day, Dublin, OH (US); Scott L. Swartz, Columbus, OH (US); Matthew M. Seabaugh, Columbus, OH (US); Paul H. Matter, Columbus, OH (US); Jared R. Archer, Marysville, OH (US)

(73) Assignee: NexTech Materials, Ltd., Lewis Center, OH (US)

( * ) Notice: Subject to any disclaimer, the term of this patent is extended or adjusted under 35 U.S.C. 154(b) by 1188 days.

(21) Appl. No.: 12/001,062

(22) Filed: Dec. 7, 2007

(65) Prior Publication Data

US 2009/0148742 A1 Jun. 11, 2009

(51) Int. Cl.
H01M 4/58 (2010.01)

(52) U.S. Cl.
USPC ........................................................ 429/486

(58) Field of Classification Search
USPC ........................................................ 429/486
See application file for complete search history.

(56) References Cited

U.S. PATENT DOCUMENTS

| 4,702,971 | A | 10/1987 | Isenberg |
| 5,589,285 | A | 12/1996 | Cable et al. |
| 5,645,930 | A | 7/1997 | Tsou |
| 6,228,521 | B1 | 5/2001 | Kim et al. |
| 6,803,141 | B2 | 10/2004 | Pham et al. |
| 6,972,161 | B2 | 12/2005 | Beatty et al. |
| 7,229,537 | B2 | 6/2007 | Chen et al. |
| 7,244,526 | B1 | 7/2007 | Meinhardt et al. |
| 7,736,787 | B2 | 6/2010 | Day et al. |
| 2003/0027033 | A1 | 2/2003 | Seabaugh et al. |
| 2003/0232230 | A1 | 12/2003 | Carter et al. |
| 2004/0121222 | A1* | 6/2004 | Sarkar et al. ............... 429/45 |
| 2004/0202918 | A1 | 10/2004 | Mardilovich et al. |
| 2005/0074664 | A1 | 4/2005 | Song et al. |
| 2005/0227133 | A1 | 10/2005 | Gorte et al. |
| 2005/0271919 | A1 | 12/2005 | Hata et al. |

(Continued)

FOREIGN PATENT DOCUMENTS

| JP | 08-031424 | 2/1996 |
| JP | H08306361 A | 11/1996 |

(Continued)

OTHER PUBLICATIONS

Dictionary Definition of the Word Adjacent.*

(Continued)

*Primary Examiner* — Ula C Ruddock
*Assistant Examiner* — Frank Chernow
(74) *Attorney, Agent, or Firm* — Porter Wright Morris & Arthur LLP

(57) ABSTRACT

Electrode materials systems for planar solid oxide fuel cells with high electrochemical performance including anode materials that provide exceptional long-term durability when used in reducing gases and cathode materials that provide exceptional long-term durability when used in oxygen-containing gases. The anode materials may comprise a cermet in which the metal component is a cobalt-nickel alloy. These anode materials provide exceptional long-term durability when used in reducing gases, e.g., in SOFCs with sulfur contaminated fuels. The cermet also may comprise a mixed-conducting ceria-based electrolyte material. The anode may have a bi-layer structure. A cerium oxide-based interfacial layer with mixed electronic and ionic conduction may be provided at the electrolyte/anode interface.

11 Claims, 16 Drawing Sheets

(56) References Cited

U.S. PATENT DOCUMENTS

| | | |
|---|---|---|
| 2006/0008696 A1* | 1/2006 | Cha et al. ............... 429/38 |
| 2006/0133993 A1* | 6/2006 | Dieckmann et al. ......... 423/651 |
| 2006/0166070 A1 | 7/2006 | Hickey et al. |
| 2006/0177725 A1 | 8/2006 | Seabaugh et al. |
| 2006/0197264 A1* | 9/2006 | Cutler et al. ............ 264/618 |
| 2006/0234100 A1 | 10/2006 | Day et al. |
| 2006/0257714 A1 | 11/2006 | Sato et al. |
| 2006/0257718 A1* | 11/2006 | Sato et al. ............... 429/44 |
| 2006/0280998 A1 | 12/2006 | Ying et al. |
| 2007/0178366 A1 | 8/2007 | Mahoney et al. |
| 2007/0180689 A1 | 8/2007 | Day et al. |
| 2007/0184324 A1 | 8/2007 | Lyons et al. |
| 2007/0238007 A1 | 10/2007 | Katagiri et al. |
| 2008/0254336 A1 | 10/2008 | Batawi |
| 2009/0148743 A1 | 6/2009 | Day et al. |
| 2010/0167169 A1 | 7/2010 | Day et al. |

FOREIGN PATENT DOCUMENTS

| | | |
|---|---|---|
| JP | H11219710 A | 8/1999 |
| JP | 2002-080869 | 3/2002 |
| JP | 2005-166563 | 6/2005 |
| JP | 2006040612 A | 2/2006 |

OTHER PUBLICATIONS

English Translation of JP 2006-040612.*
English abstract of JPH11219710A, Aug. 10, 1999.
English abstract of JP2006040612A, Feb. 9, 2006
English abstract of JPH08306361A, Nov. 22, 1996.
Machine translation of JP08-031424, Feb. 2, 1996
Machine translation of 2005-166563, Jun. 23, 2005
Machine translation of 2002-080869, Mar. 22, 2002

* cited by examiner

HIGH PERFORMANCE MULTILAYER ELECTRODES FOR USE IN REDUCING GASES

CROSS-REFERENCE TO RELATED APPLICATIONS

Not applicable.

STATEMENT REGARDING FEDERALLY SPONSORED RESEARCH

Not applicable.

REFERENCE TO MICROFICHE APPENDIX

Not applicable.

FIELD OF THE INVENTION

This invention relates to materials and fabrication processes for planar electrochemical cells. The disclosed materials and processes are particularly well suited to applications in which high long-term stability, high efficiency operation, sulfur tolerance and/or high volumetric and gravimetric power densities of stacks of planar cells are desirable. This invention may be useful in electrochemical gas separation systems and catalytic reactors, including but not limited to solid oxide fuel cells for producing power from hydrocarbons and hydrogen-containing fuels, solid oxide electrolysis systems for producing hydrogen or other fuels from steam or other feedstocks, and ceramic oxygen generation systems for producing pure oxygen from air or another oxygen-containing gas.

BACKGROUND OF THE INVENTION

Demand for efficient and reliable electrical power is escalating, outpacing the improvements in conventional power sources. Applications in which compact, lightweight, energy-dense power supplies would find immediate application include portable power generators, combined heat and power systems, and auxiliary power units for vehicles. Concerns about global climate change are increasing with the level of $CO_2$ in our atmosphere caused by the use of combustion based methods to generate power from fossil fuels. Fuel cells offer a viable approach to increase efficiency of power generation from fossil fuels while greatly reducing emissions of pollutants and greenhouse gases. Of the various types of fuel cells, the proton exchange membrane (PEM) fuel cell, which operates with hydrogen as a fuel, has received considerable attention due to its low weight, low-temperature operation, and ease of manufacture. However, the operation of PEM fuel cells with fossil-based hydrocarbon fuels requires extensive pre-processing (reforming) to convert the hydrocarbons into a hydrogen rich gas and subsequent gas purification steps to reduce carbon monoxide and sulfur to very low levels (CO<10 ppm and $H_2S$<10 ppb). Solid oxide fuel cells (SOFCs), which operate at high temperature (typically, 600 to 1000° C.), are much less sensitive to impurities in hydrocarbon fuels, which minimizes the amount of gas purification steps required. This greatly increases power generation efficiency and reduces system complexity. It also is theoretically possible to operate solid oxide fuel cells directly on certain hydrocarbon fuels (e.g., methane, methanol and ethanol) via internal reforming, i.e., without an initial reforming step.

A solid oxide fuel cell is comprised of an oxygen ion conducting ceramic electrolyte membrane that is sandwiched by a fuel electrode (anode) and an air electrode (cathode). Power is generated by passing air (or oxygen) over the cathode and fuel (e.g., hydrogen plus carbon monoxide) over the anode and collecting the electrical current that is created by the electrochemical reaction of oxygen with fuel to form steam and carbon dioxide. The key to successful development of SOFC systems is the electrochemical cell design and "stacking" configuration (i.e., the manner in which SOFC elements are configured within a power producing SOFC module). In this regard, it is important to pack a large amount of active area for electrochemical reactions within the smallest volume possible. A typical solid oxide fuel cell will generate about 30 to 40 watts of power for every 100 $cm^2$ of active area—this translates to more than about 3000 $cm^2$ of active area for a kilowatt of power. Another key is maximizing the electrical efficiency of power generation (defined as the output power divided by the lower heating value of the input fuel). A reasonable target for commercially viable systems is electrical efficiency of greater than approximately 50 percent. This requires that most of the fuel fed to the SOFC be used to generate power. The various cell and stack design alternatives are discussed in the following paragraphs.

Tubular solid oxide fuel cells include a multi-layer tube fabricated with cathode, electrolyte, anode layers, and in some cases interconnect layers. Tubular SOFCs may be supported by anode, cathode, or electrolyte materials or a porous inert and electrically insulating material with subsequently deposited thin-film anode, electrolyte, cathode and interconnect layers. Conventional tubular cells typically suffer from low volumetric or gravimetric power density because large tubes do not pack well and have a low surface area to volume ratio. Power densities achievable with conventional tubular cells also are limited by the long current collection paths intrinsic to long-length tubular cells. Micro-tubular SOFCs, typically with diameters of less than about 5 mm, overcome some of the disadvantages of conventional tubular fuel cells. Sealing of small diameter microtubes is simpler than sealing of conventional tubes. Microtubular cells also overcome the low surface area to volume ratio associated with conventional tubular cells. However, microtubular cells require complex manifolding and electrical interconnection schemes so that scaling to higher powers (more than about 100 watts) is difficult.

Planar SOFCs may be supported by either the anode material or the electrolyte material, also have been demonstrated extensively. Anode-supported cells often are preferred because these cells can accommodate a thin electrolyte layer (less than about 20 microns). This reduces electrolyte ohmic resistance in the cell and allows operation at relatively low temperatures (e.g., T<800° C.). Planar anode-supported cells are particularly attractive for mass market, cost-driven applications because of their high areal power density and their advantageous packing efficiency. Performance of anode-supported cells at 700° C. has been demonstrated to be over 1 $W/cm^2$ in small cells at low fuel use. With appropriate seal and interconnect technology, power densities greater than 0.4 $W/cm^2$ have been reported for anode-supported cell stacks. However, anode-supported cells are not without drawbacks. When conventional nickel oxide/yttrium-stabilized zirconia (NiO/YSZ) composites are used as support materials, the reduction of NiO to nickel metal creates stress in the electrolyte layer, which may result in considerable deformation of the support. Operating planar anode-supported cells at high power density and high fuel use also is difficult; the thick porous layer prevents rapid diffusion of steam away from the electrolyte and results in increased cell area-specific resistance (ASR) at high current density.

Electrolyte-supported planar cells have an electrolyte layer that provides the mechanical strength of the cell. Electrolyte-supported cells offer numerous advantages in the production of SOFCs. The sealing of electrolyte-supported cells is simpler than electrode-supported planar cells because a dense electrolyte perimeter can be preserved during cell processing, which provides a dense, smooth surface for sealing operations. Electrolyte-supported cells also have good stability during reduction. Because only a thin layer of anode is affected by the reduction process, this process generally has little impact on cell mechanical stability. The gas diffusion path in and out of the thinner anode layer is short, making fuel and steam diffusion limitations less of a concern. However, under identical operating conditions, conventional electrolyte-supported cells often exhibit much higher area-specific resistance values than anode-supported cells because the electrolyte is more resistive than the anode or cathode materials. To compensate for this higher area-specific resistance, the operating temperature for electrolyte-supported cells generally is higher than anode-supported cells using the same materials set. The higher operating temperature of the electrolyte-supported cells can be a drawback, particularly for developers wishing to use metallic interconnect materials.

Two recent U.S. patent application Ser. No. 11/109,471 (published Oct. 19, 2006) and Ser. No. 11/220,361 (published Mar. 8, 2007), owned by NexTech Materials, Ltd., describe novel planar cell structures that overcome technical barriers associated with building SOFC stacks with conventional planar cells. The first of these, referred to as the FlexCell, comprises a thin electrolyte membrane layer that is mechanically supported by a "honeycomb" mesh layer of electrolyte material (see FIGS. 1 and 2). More than 75 percent of the electrolyte membrane within the active area of the FlexCell is thin (20-40 microns) and the periphery of the cell is dense. Electrode (anode and cathode) layers are subsequently deposited onto the major faces within the active cell regions to complete the fabrication of an SOFC based on the FlexCell structure. The second structure, referred to as the HybridCell, comprises an anode layer (30-40 microns) co-sintered between the mesh support layer and the electrolyte membrane layer (see FIGS. 3 and 4). The entire active cell area of the HybridCell has a thin electrolyte membrane (10-20 microns) and the periphery of the cell is dense. The cathode layers are subsequently deposited onto the major faces within the active cell region to complete the fabrication of an SOFC based on the HybridCell structure. Specific advantages of these two types of cells are summarized below:

Thin Electrolyte Membrane Layers for High Performance. Both the FlexCell and HybridCell feature a thin electrolyte membrane layer (10-40 microns), which minimizes electrolyte ohmic losses at lower operating temperatures. Thus, SOFC performance levels achieved with these cells can be made equivalent to those of anode supported cells.

Small Repeat Units for High Power Density. The total thickness of the FlexCell and HybridCell are less than 200 microns after deposition of electrodes, which compares to more than 600-1000 microns thickness of conventional anode supported cells. This greatly reduces size and weight contributions of the cells to the total stack weight and volume. Thus, high power density SOFC stacks can be constructed.

Mechanical Strength and Flexibility. The use of partially stabilized zirconia (yttria or scandia doped) as the mesh support component of the cell results in high mechanical strength, which makes the cell easier to handle during stack fabrication operations. This also reduces the amount of pressurization required during stack operation because pressure is required only to maintain gas-tight seals and not to keep the cells flat (as is the case with anode supported cells).

Dense Perimeter for Ease of Sealing. The dense electrolyte perimeter of the FlexCell and HybridCell structures aids sealing. The sealing surfaces are dense and made of a relatively inert electrolyte material rather than porous and made of a relatively reactive electrode material.

Thin Anode for Redox and Thermal Cycling Tolerance. The thin anode layer intrinsic to the FlexCell and HybridCell structures makes it much easier to produce cells that are tolerant to both redox and thermal cycling. Thus, excessive measures are not required to maintain the anode in its fully reduced state during transient operation of SOFC stacks.

Anode Material Flexibility. A specific advantage of the FlexCell design is that the anodes are deposited in a separate manufacturing operation. This makes it easy to incorporate new anode materials that provide greater functionality (e.g., anodes that are tolerant to sulfur impurities).

For SOFCs to be of practical application, they must operate using fuels that are easily available. This requires that power supplies operate on conventional fuels, such as gasoline, natural gas, and diesel. The hydrocarbon fuel is pre-reacted (reformed) over a catalyst with air and/or steam to produce a mixture of $H_2$ and CO (and in some cases $CH_4$) gas before delivery to the fuel cell. Promising development is underway to provide compact and lightweight reformers for conventional fuels. However, traditional fuels contain some level of sulfur. Sulfur can have devastating effects on conventional SOFC performance. Cermet mixtures of nickel metal with electrolyte materials (YSZ or GDC) are the most common SOFC anodes, but are susceptible to sulfur poisoning in concentrations as low as a few ppm. This leads to significant performance degradation, especially at lower operating temperatures (700-800° C.) which are desired for SOFC stacks that use inexpensive metallic interconnect components. Nickel-based cermet anodes experience a two-stage deactivation when exposed to sulfur (see FIG. 5). The following mechanisms have been proposed:

Stage I Degradation: The first stage of anode degradation is characterized by a rapid drop in cell performance upon introduction of sulfur to the fuel and is nearly instantaneous. Stage I degradation is largely recoverable upon removal of the sulfur contaminant. The Stage I degradation process is theorized to be related to the coverage of active nickel sites (at triple-phase boundary regions) with sulfide. The reactions that occur in Ni/YSZ anodes are shown below:

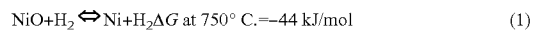

$$NiO + H_2 \Leftrightarrow Ni + H_2 \Delta G \text{ at } 750° \text{ C.} = -44 \text{ kJ/mol} \tag{1}$$

$$3Ni + 2H_2S \Leftrightarrow Ni_3S_2 + 2H_2 \Delta G \text{ at } 750° \text{ C.} = -68 \text{ kJ/mol} \tag{2}$$

While bulk nickel sulfide formation is not favored in low concentrations of $H_2S$ (<2000 ppm), sulfidation of small nickel particles and rough surfaces does proceed readily even in very low $H_2S$ concentrations. Surface sulfidation (but not in the bulk) of nickel to $Ni_3S_2$ has been observed experimentally with Raman spectroscopy by analyzing a Ni/YSZ cermet exposed to 100 ppm $H_2S$.

Stage II Degradation: The second stage is characterized by a slower degradation of cell performance, which is not recoverable. Some researchers have reported a cascading effect at longer times. The mechanism of this degradation is theorized to be due to a loss of nickel surface area through surface rearrangement and sintering of the nickel particles. Nickel sulfide ($Ni_3S_2$) has a melting point of 787° C.; thus, sulfide formation could contribute extensively to nickel sintering.

Desulfurizers are being developed to protect fuel cell anodes from sulfur but they are too large, heavy and complex for many applications, accounting for 10-50% of total system weight, depending on the targeted fuel and useful desulfurizer life. Additionally, desulfurizers add cost and maintenance requirements to SOFC systems. An ideal SOFC system would tolerate sulfur without the cost, weight, and volume of the desulfurizer although for certain applications inclusion of a desulfurizer still may be preferred. In such systems, the capability of SOFC anodes to resist degradation by sulfur will offer an opportunity to minimize the durations between replacement of sulfur adsorbent beds, so that all of the desulfurizer capacity can be used and service costs reduced. Sulfur tolerant SOFC anodes therefore are a critical and enabling technology need. One embodiment of the present invention is an entirely new approach to achieving sulfur tolerance in solid oxide fuel cells. A novel anode materials system, based on commonly used SOFC materials and methods, provides the unique capability to achieve sulfur tolerance in SOFCs without sacrificing power density, resorting to excessively high SOFC operating temperatures, or adding significant cost.

A key to controlling cost in planar solid oxide fuel cell stacks is the use of low-cost metals for the interconnect components. In addition to low cost, there are a number of technical requirements of metallic interconnect materials, including but not limited to thermal expansion match with SOFC materials, high oxidation resistance at elevated temperatures in oxidizing environments, and the ability to use low cost fabrication methods (e.g., rolling and stamping) to fabricate interconnect materials of desired shapes. Many alloys have been evaluated but only a few have been shown to possess the desired properties. In particular, chromium-containing ferritic alloys (e.g., Crofer 22-APU, E-Brite, SS-441, and others known in the art) have shown promise for SOFC applications. Although these alloys are not completely immune to oxidation at SOFC operating temperatures (i.e., on the cathode faces), the scale that forms during oxidation is itself electrically conducting. However, these alloys do show a tendency for chrome evaporation during SOFC operation, with chrome migrating to the cathode material and causing deterioration of cathode performance. For this reason, considerable effort has been focused on the development of coatings that could be applied to the cathode faces of the metallic interconnects for the dual purposes of further suppressing alloy oxidation or suppressing migration of the volatilized chrome species. Although progress is being made in development of such coatings, another embodiment of this invention is a novel cathode materials system for stabilizing cathode materials against the deleterious effect of chrome poisoning.

BRIEF DESCRIPTION OF THE DRAWINGS

These and further objects of the invention will become apparent from the following detailed description.

DESCRIPTION OF THE INVENTION

Figure 1:
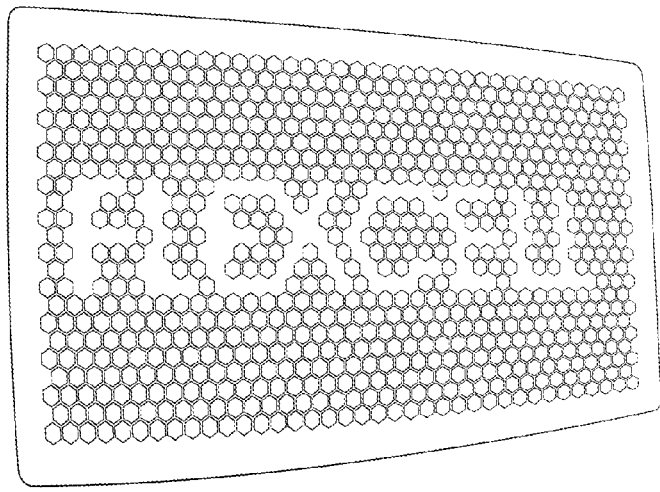
FIG. 1 is a picture of a planar electrolyte membrane based on the FlexCell structure.
Figure 2:
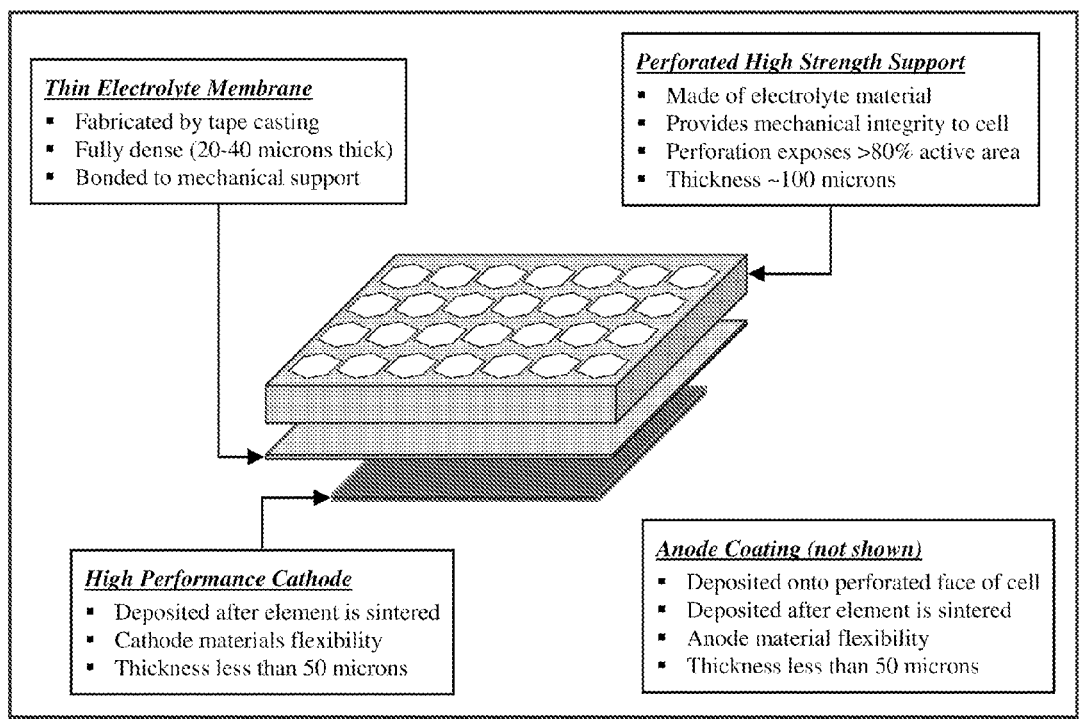
FIG. 2 is a schematic diagram of the FlexCell architecture.
Figure 3:
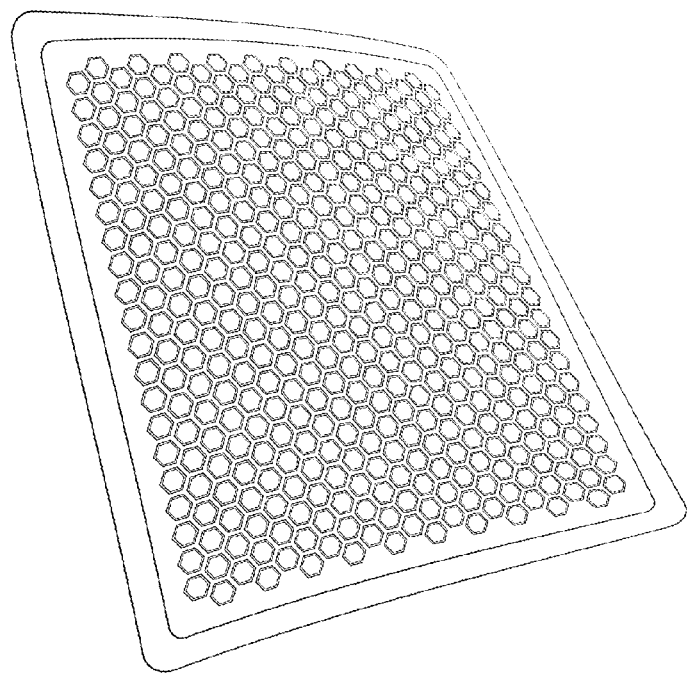
FIG. 3 is a picture of an anode/electrolyte bi-layer membrane based on the HybridCell structure.
Figure 4:
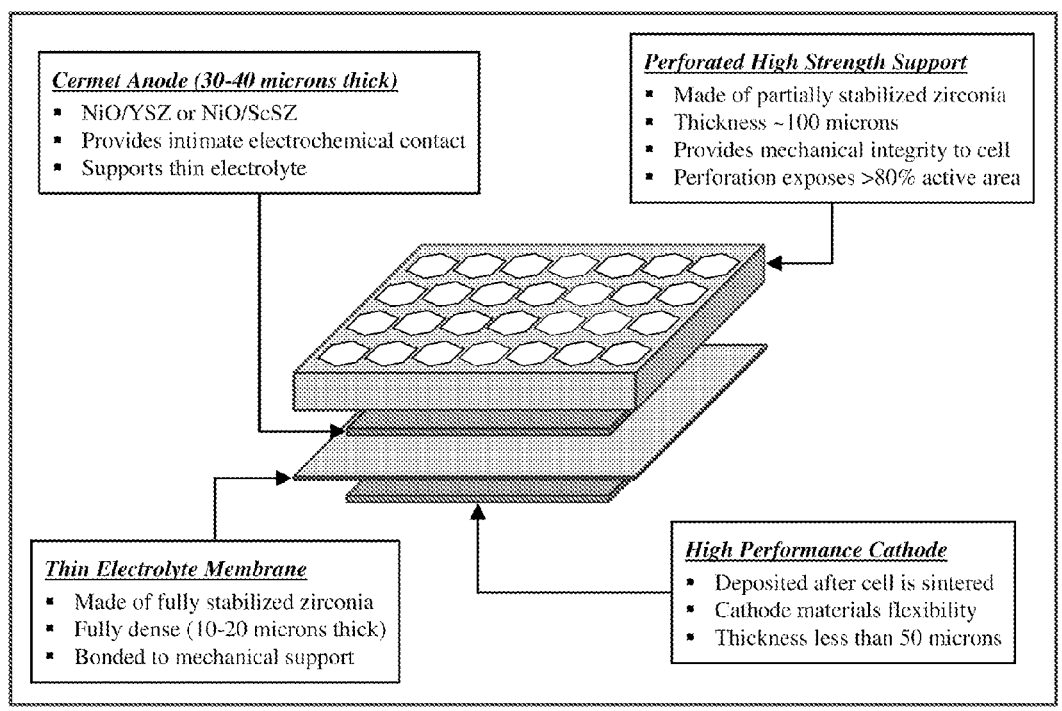
FIG. 4 is a schematic diagram of the HybridCell architecture.

The present invention provides electrode materials systems for planar solid oxide fuel cells with high electrochemical performance. The novel anode materials provide exceptional long-term durability when used in reducing gases. The novel cathode materials provide exceptional long-term durability when used in oxygen-containing gases.

The present invention provides novel cermet anode materials in which the metal component of the cermet is a cobalt-nickel alloy rather than nickel metal. These anode materials provide exceptional long-term durability when used in reducing gases, e.g., in SOFCs with sulfur contaminated fuels. The present invention also provides a cermet anode having a mixed-conducting ceria-based electrolyte material rather than a conventional purely ionically conducting doped zirconia electrolyte material. In addition, the present invention provides a bi-layer anode structure to separate and optimize electrochemical activity, gas transport, and current collection functions. The present invention further provides a cerium oxide based interfacial layer with mixed electronic and ionic conduction at the electrolyte/anode interface. Although each of the foregoing aspects of the invention may be used independently or in combinations of less than all of the aspects, the combination of all of these aspects may offer particular advantages.

The present invention provides novel cathode materials comprising zinc-doped lanthanum strontium ferrite (LSZF) or an alternative ferrite, cobaltite or nickelate ceramic electrode material rather than conventional lanthanum strontium manganite (LSM). The cathode materials also may comprise a mixed-conducting ceria-based electrolyte material rather than a purely ionically conducting doped zirconia electrolyte materials used in conventional composite cathodes. The cathode materials also may comprise a palladium dopant. In addition, the present invention provides a bi-layer cathode structure to separate and optimize electrochemical activity, gas transport and current collection functions. The present invention further provides a ceria-based interfacial layer with mixed electronic and ionic conduction at the electrolyte/cathode interface. Although each of the foregoing aspects of the invention may be used independently or in combinations of less than all of the aspects, the combination of all of these aspects results in an SOFC cathode with superior electrochemical performance compared to conventional LSM based cathodes used in oxygen containing gases. This multilayer cathode system and its palladium doped cathode material also exhibit a high degree of tolerance to chromium contamination during operation with metallic interconnect materials.

High Performance, Multilayer Anode System

The high performance, multilayer anode system disclosed herein incorporates four major embodiments: (1) a cerium oxide based interfacial layer with mixed electronic and ionic conduction at the electrolyte/anode interface; (2) a bi-layer anode structure to separate and optimize electrochemical activity, gas transport and current collection functions; (3) a cermet anode in which the electrolyte material comprises a mixed-conducting ceria-based electrolyte material; and (4) a cermet anode in which the metal component comprises a cobalt-nickel alloy. Combined, these four embodiments produce an SOFC anode with superior electrochemical performance compared to conventional Ni/YSZ cermet anodes (see FIG. 6). Further, this multilayer anode system exhibits a high degree of sulfur tolerance. The structure of the multilayer anode system is depicted in FIG. 7 and described in detail below.

More specifically, the invention provides a sulfur tolerant anode material for use in an electrochemical device such as a solid oxide fuel cell. The anode material may be a cermet in which the metallic component comprises at least one of nickel, an alloy containing nickel and cobalt, and a mixture of nickel and cobalt compositions, and the ceramic component comprises a mixed conducting electrolyte material. The mixed conducting electrolyte material may be a doped ceria electrolyte material, a doped zirconia electrolyte material, a lanthanum strontium magnesium gallium oxide (LSGM), another oxygen-ion-conducting ceramic electrolyte material, or a mixture thereof. The doped ceria electrolyte material may be a gadolinium doped ceria, a samarium doped ceria, a zirconium doped ceria, a scandium doped ceria, a yttrium doped ceria, a calcium doped ceria, a strontium doped ceria, cerium oxide doped with at least one element selected from rare earth and alkaline earth elements, or a combination thereof. The doped zirconia electrolyte material may be a yttrium doped zirconia, a scandium doped zirconia, a calcium doped zirconia, zirconium oxide doped with at least one element selected from rare earth and alkaline earth elements, or a combination thereof. The cermet may comprise 20 to 80 percent by weight of an ceramic electrolyte material selected from gadolinium doped ceria and samarium doped ceria.

The invention also provides an anode for a solid oxide fuel cell, the anode comprising a cermet in which the metallic component comprises at least one of nickel, an alloy containing nickel and cobalt, and a mixture of nickel and cobalt compositions and the ceramic component comprises a mixed conducting electrolyte material, with nanoscale particles of a ceramic material being resident within the grains of the metallic component. The nanoscale ceramic material may be a doped zirconia electrolyte material, a doped ceria electrolyte material, or a combination thereof. The anode may be prepared by the process of selecting a powdered anode precursor from nickel oxide, a solid solution of nickel oxide and at least one other metallic oxide, a compound including nickel oxide and at least one other metal oxide, and mixtures thereof, wherein the at least one other metal oxide is selected from cobalt oxide, iron oxide, copper oxide, and mixtures thereof; combining the powdered anode precursor with a nanoscale ceramic material to produce a powdered anode precursor/nanoscale ceramic material combination; calcining the powdered anode precursor/nanoscale ceramic material combination; mixing the calcined powdered anode precursor/nanoscale ceramic material combination with a ceramic electrolyte powder; depositing the mixture on a substrate; sintering the deposited material; and reducing the sintered material in the presence of hydrogen or a reducing gas mixture. The process further may comprise the steps of selecting the nanoscale ceramic material from a doped zirconia electrolyte material and a doped ceria electrolyte material and/or selecting the ceramic electrolyte powder from a doped zirconia electrolyte material, a doped ceria electrolyte material, and combinations thereof.

The invention also provides a bi-layer anode/electrolyte interfacial layer for separating an anode from an electrolyte membrane in a solid oxide fuel cell. The anode/electrolyte interfacial layer may comprise a first thin dense ceria layer on the surface of a ceramic electrolyte membrane and a second thin porous ceria layer on the dense ceria layer. The thin dense ceria layer may comprise a doped ceria electrolyte material and the thin porous ceria layer may comprise a doped ceria electrolyte material. The ceramic electrolyte membrane may comprise a doped zirconia electrolyte material. At least one of the ceria layers may be doped with cobalt.

In addition, the invention provides an anode for a solid oxide fuel cell for use with sulfur-containing fuel streams, the anode comprising a first cermet anode layer on an electrolyte layer, the metallic component of the first cermet comprising at least one of nickel, an alloy containing nickel and cobalt, and a mixture of nickel and cobalt compositions, and the ceramic component of the first cermet comprising a mixed conducting electrolyte material and a second cermet anode layer on the first cermet anode layer, the metallic component of the second cermet comprising at least one of nickel, an alloy containing nickel and cobalt, and a mixture of nickel and cobalt compositions, the ceramic component of the second cermet comprising a ceramic electrolyte material, and the cermet having a coarser microstructure and a higher metal content than the first cermet layer. The mixed conducting electrolyte material in the first cermet anode layer may be a doped ceria electrolyte material and the ceramic electrolyte material in the second cermet layer may be a doped zirconia electrolyte material, a doped ceria electrolyte material, or a combination thereof. The anode may have nanoscale particles of a ceramic material resident within the grains of the metallic component of at least one of the cermet layers, the nanoscale ceramic material being selected from a doped ceria electrolyte material, a doped zirconia electrolyte material, and combinations thereof.

The invention also provides an anode system for a solid oxide fuel cell for use with sulfur-containing fuel streams, the anode comprising a first anode/electrolyte interfacial layer comprising a thin dense ceria layer on an electrolyte membrane, a second anode/electrolyte interfacial layer comprising a porous ceria layer on the first anode/electrolyte interfacial layer, a first cermet anode layer on the second anode/electrolyte interfacial layer, the metallic component of the first cermet comprising at least one of nickel, an alloy containing nickel and cobalt, and a mixture of nickel and cobalt compositions, and the ceramic component of the first cermet comprising a mixed conducting electrolyte material, and a second cermet anode layer on the first cermet anode layer, the metallic component of the second cermet comprising at least one of nickel, an alloy containing nickel and cobalt, and a mixture of nickel and cobalt compositions, the ceramic component of the second cermet comprising a ceramic electrolyte material, and the cermet having a coarser microstructure and a higher metal content than the first cermet layer. At least one of the anode/electrolyte interfacial layers may comprise a doped ceria electrolyte material. Alternatively, at least one of the anode/electrolyte interfacial layers may comprise a ceria electrolyte material doped with cobalt. Nanoscale particles of a ceramic material may be resident within the grains of the metallic component of at least one of the cermet layers, the nanoscale ceramic material being selected from a doped ceria electrolyte material, a doped zirconia electrolyte material, and combinations thereof.

The invention also provides a solid oxide fuel cell for use with a sulfur containing fuel stream. The solid oxide fuel cell may comprise a ceramic electrolyte membrane, a bi-layer anode/electrolyte interfacial layer on one face of the ceramic electrolyte membrane, an anode applied to the bi-layer anode/electrolyte interfacial layer, the anode comprising a cermet in which the metallic component comprises at least one of nickel, an alloy containing nickel and cobalt, and a mixture of nickel and cobalt compositions, and the ceramic component is a mixed conducting ceramic electrolyte material, and a cathode applied to the opposite face of the ceramic electrolyte membrane. The bi-layer anode/electrolyte interfacial layer may comprise a first thin dense ceria layer on the ceramic electrolyte membrane surface and a thin porous ceria layer on the thin dense ceria layer. The anode may comprise a first anode layer on the porous ceria layer and a second anode layer on the first anode layer, the first anode layer comprising a cermet in which the metallic component comprises at least one of nickel, an alloy containing nickel and cobalt, and a mixture of nickel and cobalt compositions, and the ceramic component is a ceria-based electrolyte material, and having a having a fine-scale microstructure and the second anode layer comprising a cermet in which the metallic component comprises at least one of nickel, an alloy containing nickel and cobalt, and a mixture of nickel and cobalt compositions, and a ceramic component comprising a ceramic electrolyte material, and having a coarser microstructure and a higher nickel content than the first anode layer. Nanoscale particles of a ceramic electrolyte material are resident within the metallic component of at least one of the cermet anode layers, the nanoscale electrolyte material being selected from a doped zirconia material, a doped ceria material, and combinations thereof.

The invention also provides a solid oxide fuel cell for use with a reducing gas, the solid oxide fuel cell comprising a ceramic electrolyte membrane, an anode interfacial layer comprising a thin dense ceria layer on the ceramic electrolyte membrane surface and a porous ceria layer on the thin dense ceria layer, an anode comprising a first anode layer on the porous ceria layer and a second anode layer on the first anode layer, the first anode layer comprising a cermet in which the metallic component comprises at least one of an alloy containing nickel and cobalt and a mixture of nickel and cobalt compositions, the ceramic component comprises a mixed conducting ceria-based electrolyte material, and having a fine-scale microstructure; the second anode layer comprising a cermet in which the metallic component comprises at least one of nickel, an alloy containing nickel and cobalt, and a mixture of nickel and cobalt compositions, the ceramic component comprises a ceramic electrolyte material, and having a coarser microstructure and a higher nickel content than the first anode layer; nanoscale particles of a ceramic electrolyte material being resident within the grains of the metallic component of at least one of the anode layers, and a cathode on the ceramic electrolyte membrane. Alternatively, the solid oxide fuel cell for use with a reducing gas may comprise a ceramic electrolyte membrane, an electrolyte/anode interfacial layer comprising a thin dense ceria layer on the ceramic electrolyte membrane surface and a porous ceria layer on the thin dense ceria layer, a bi-layer anode comprising a first anode layer on the porous electrolyte/anode interfacial layer and a second anode layer on the first anode layer, the first anode layer comprising a cermet in which the metallic component comprises at least one of nickel, an alloy containing nickel and cobalt, and a mixture of nickel and cobalt compositions and the ceramic component comprises a mixed conducting ceria-based electrolyte material and having a fine-scale microstructure; the second anode layer comprising a cermet in which the metallic component comprises at least one of nickel, an alloy containing nickel and cobalt, and a mixture of nickel and cobalt compositions and the ceramic component comprises a ceramic electrolyte material and having a coarser microstructure and a higher nickel content than the first anode layer, and wherein nanoscale particles of a ceramic electrolyte material are resident within the grains of the metallic component of at least one of the anode layers, an electrolyte/cathode interfacial layer comprising a first thin dense ceria layer on the opposing side of the ceramic electrolyte membrane and a second thin porous ceria layer on the thin dense ceria layer, and a bi-layer cathode comprising a first cathode layer on the porous electrolyte/cathode interfacial layer and a second cathode layer on the first cathode layer, the first cathode layer comprising a composite of a mixed conducting ceria-based electrolyte material and a ceramic electrode material and having a fine microstructure and small-scale porosity and the second cathode layer comprising a single phase ceramic electrode material and having a coarser microstructure and larger scale porosity than the first cathode layer.

Anode/Electrolyte Interfacial Layer:

An interfacial layer of a ceria-based electrolyte material with mixed ionic and electronic conductivity and a tailored microstructure is deposited at the anode/electrolyte interface. The interfacial layer is deposited in two steps, whereby the first step provides a thin dense ceria film on the electrolyte membrane surface and the second step provides a porous ceria film with an intentionally textured surface on the thin dense ceria film. The total ceria interlayer thickness is approximately 2-3 microns. Densification and adhesion of the two ceria interfacial layer coatings during annealing are enhanced by doping with cobalt. The dense portion of the layer changes the nature of the electrolyte surface, leaving only mixed conducting interfaces between the electrolyte and anode, while extending the active electrode area. The porous portion of the interfacial layer increases the volume of triple-phase boundary regions at the anode/electrolyte interface thus reducing resistance to oxygen transport and provides a rough surface that provides for good adhesion of subsequently deposited anode coatings. The high level of oxygen ion conductivity is critical to preventing sulfidation of surface nickel sites in the active anode region. Oxidation of nickel sulfide to $SO_x$ is a critical reaction to maintain high anode activity in the presence of sulfur. Table 1 shows the high dependence of sulfide oxidation on temperature relative to other anode reactions, explaining the well-known relation of improved sulfur tolerance with increasing temperature.

TABLE 1

Gibbs free energies of reactions involving sulfur species.

| | Reaction | $\Delta G_{RXN}$ at T (° C.) | | |
|---|---|---|---|---|
| | | 750 | 800 | 850 |
| (1) | $3Ni + 2H_2S = Ni_3S_2 + 2H_2$ | −68 | −65 | −62 |
| (2) | $Ni_3S_2 + O_2 = 3Ni + 2SO$ | 48 | 22 | −4 |
| (3) | $2CeO_{1.72} + 1.44H_2S = Ce_2O_2S + 1.44H_2O$ | −10 | −12 | −14 |
| (4) | $Ce_2O_2S + O_2 = Ce_2O_3 + SO$ | −162 | −163 | −164 |
| (5) | $SO + \frac{1}{2}O_2 = SO_2$ | −224 | −220 | −216 |

Figure 8:
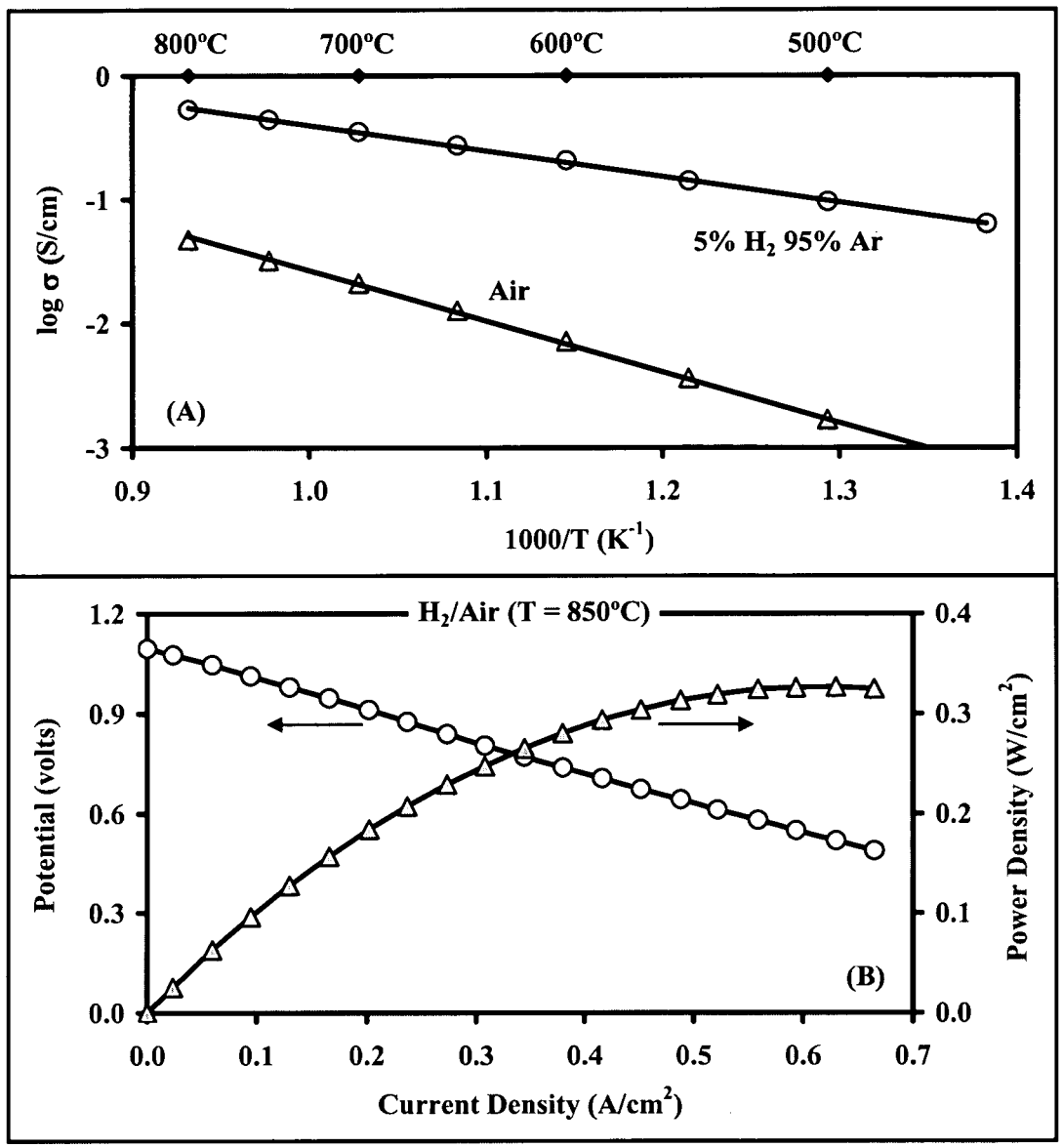
FIG. 8 shows plots of electrical conductivity of samarium-doped ceria (SDC) in air and reducing atmospheres (top) and SOFC data obtained via button cell testing of an electrolyte supported solid oxide fuel cell with a pure ceramic gadolinium-doped ceria (GDC) anode at 850° C. (bottom).

Reaction 2, above, is more favorable at higher temperatures and can proceed quickly only if the active nickel phase is in direct contact with a high-conductivity mixed conductor. Thus, the mixed conducting ceria interfacial layer provides for the facile oxidation of sulfided nickel in the active anode region. A typical material with high mixed conductivity in reducing atmospheres is cerium oxide doped with samarium, gadolinium, or other rare earth and/or alkaline earth elements. The high conductivity of samarium-doped ceria (SDC) in reducing atmospheres is shown in FIG. 8. The electronic conductivity of SDC in the active anode layer extends electron transfer by increasing triple-phase boundary area into the anode from the anode/electrolyte interface. Because of the mixed conductive and catalytic nature of ceria, it also participates in anode reactions. The activity of gadolinium-doped ceria (GDC) as an anode for hydrogen oxidation is shown by data in FIG. 8. Although the performance of the pure GDC anode does not match that of Ni/zirconia or Ni/ceria cermet anodes, its activity is substantial enough to contribute to anode performance.

Figure 9:
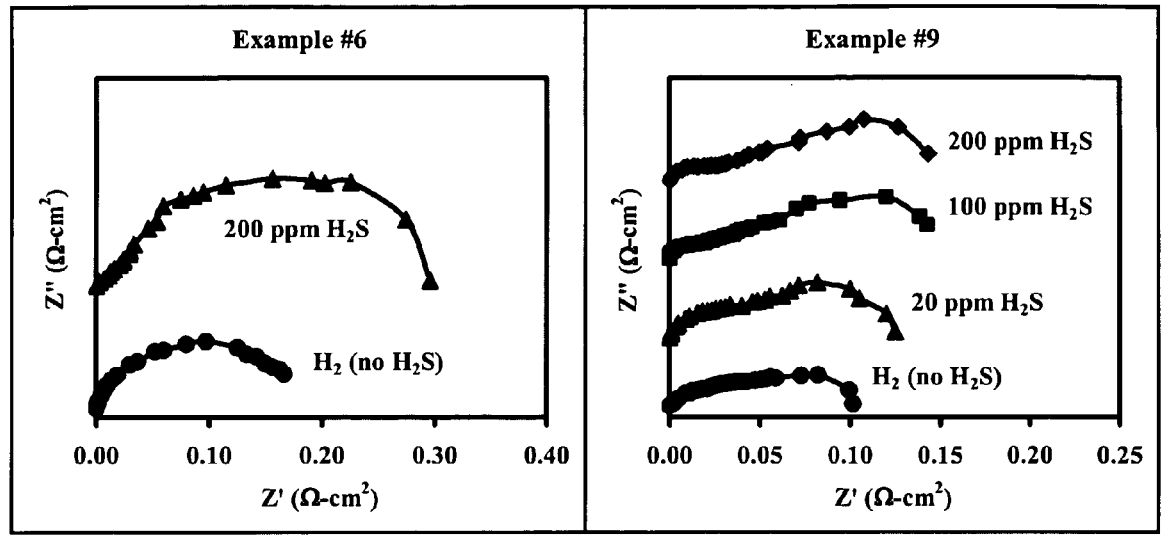
FIG. 9 is a comparison of area-specific resistance of anodes at 800° C., measured by electrochemical impedance spectroscopy with various sulfur contents, showing the importance of the ceria anode/electrolyte interfacial layer for reducing the level of Stage I deactivation upon introduction of sulfur: the FlexCell based solid oxide fuel cell of Example 6 having a multilayer Ni—Co/SDC anode with a cobalt-doped SDC anode/electrolyte interfacial layer (left); and the FlexCell based solid oxide fuel cell of Example 9 having a Ni—Co/SDC anode without a cobalt-doped SDC anode/electrolyte interfacial layer (right).

Although the use of a ceria interfacial layer provides mixed conductivity at the interface between the anode and electrolyte, which increases anode activity, a more important benefit is its positive impact on sulfur tolerance. The improvement of anode sulfur tolerance obtained with the SDC interfacial layer is shown by anode resistance measurements made using electrochemical impedance spectroscopy (EIS) in FIG. 9. Anode ASR is lower when the ceria (SDC) interfacial layer is included and the increase of anode ASR in the presence of 200 ppm $H_2S$ is significantly smaller than without the ceria interfacial layer.

Bi-Layer Anode Structure: A bi-layer cermet anode structure optimizes the electrochemical and current carrying performance of the anode system. The metallic stage of the cermet may comprise at least one of nickel, an alloy containing nickel and cobalt, a mixture of nickel and cobalt compositions. The electrochemically active layer (deposited onto the ceria interfacial layer) has a fine-scale microstructure and incorporates ceria-based electrolyte material as the ceramic phase and a cobalt-nickel alloy as the metallic phase. The current collecting anode layer has a coarser microstructure with higher base metal (nickel and cobalt) content to provide low resistance to electrical current flow. The composition of the ceramic electrolyte material in the current collecting cermet anode layer need not be the same as the composition of the ceramic electrolyte material in the active anode layer. In fact, it may be preferable for the electrolyte material in the current carrying layer to be a zirconia electrolyte material, to reduce thermal expansion mismatch with the primary structural support material in the cell (i.e., the doped zirconia ceramic electrolyte material). The active and current carrying anode layers are each approximately 15 microns thick.

Mixed Conducting Ceria Electrolyte Phase in Cermet Anode:

The mixed-conducting ceria-based electrolyte in the cermet anode not only enhances electrochemical performance but also is important to sulfur tolerance. The mixed conductive cermet provides more active sites for sulfur oxidation and more facile nickel sulfide oxidation for the same reasons described in the above discussion of the ceria interfacial layer. The mixed conducting electrolyte material may be a doped ceria electrolyte material, a doped zirconia electrolyte material, a lanthanum strontium magnesium gallium oxide (LSGM), another oxygen-ion-conducting ceramic electrolyte material, and mixtures thereof. The doped ceria electrolyte material may be a gadolinium doped ceria (GDC), a samarium doped ceria (SDC), a zirconium doped ceria, a scandium doped ceria, a yttrium doped ceria, a calcium doped ceria, a strontium doped ceria, a cerium oxide doped with at least one element selected from rare earth and alkaline earth elements, and combinations thereof, and the doped zirconia electrolyte material may be a yttrium doped zirconia (YSZ), a scandium doped zirconia (ScSZ), a calcium doped zirconia, a zirconium oxide doped with at least one element selected from rare earth and alkaline earth elements, and combinations thereof. For example, a cermet useful in a sulfur tolerant anode material may comprise 20-80 wt % ceramic electrolyte material selected from a gadolinium doped ceria and a samarium doped ceria. The ceramic electrolyte materials may include other dopants so long as they do not interfere with electrolyte function Multi-Component Metal Phase:

Binary Co—Ni alloys as the metallic phase of the cermet anode are critical to achieving high performance and sulfur tolerance. The higher melting temperature of the Ni—Co alloys and the much higher melting temperature of cobalt sulfide appear to significantly reduce steady-state degradation during operation in the presence of sulfur. When exposed to sulfur, electrolyte-supported SOFCs with binary alloy cermet anodes (Ni—Co/GDC) exhibit significantly reduced Stage II (steady-state) degradation in direct contrast to SOFCs with more conventional (Ni/GDC) anodes (see FIG. 10). This observation can be explained by the hypothesis that the sulfided form of the Ni/Co alloy has a higher melting point than nickel sulfide. The melting points of some common nickel and cobalt oxides and sulfides are shown in Table 2. The melting point of $Ni_3S_2$, the species detected in poisoned nickel anodes, is only 787° C. In contrast, cobalt sulfide has a significantly higher melting point. Thus, one would expect that sulfides of Ni—Co alloys have elevated melting points compared to pure nickel and would not sinter as readily. It also is thought that Ni—Co based anodes provide improved electrochemical performance for hydrogen oxidation reactions as they present lower resistance to the rate limiting charge transfer step in hydrogen oxidation. By extension, it is reasonable to expect that cobalt also contributes to the catalytic oxidation of sulfur containing species which has been identified as a critical feature for sulfur tolerance.

TABLE 2

Melting points of common Ni and Co compounds.

| Compound | Melting Point (° C.) |
|---|---|
| Ni | 1455 |
| NiO | 1955 |
| $Ni_3S_2$ | 787 |
| NiS | 976 |
| Co | 1495 |
| CoO | 1830 |
| CoS | 1182 |

Combining these four aspects, the impact of the two deactivation processes can be reduced and a high degree of sulfur tolerance can be achieved. The level of sulfur immunity is shown by SOFC data obtained on identical FlexCell-based SOFCs with different anodes in FIG. 11. The SOFC with the high-performance, multilayer anode system exhibited only a 2.5% performance drop with additions of up to 200 ppm sulfur over 100 hours while the SOFC with a conventional Ni-YSZ anode failed immediately upon introduction of only 20 ppm $H_2S$. The multilayer anode system is substantially more tolerant to sulfur than the conventional Ni/YSZ anode.

Figure 12:
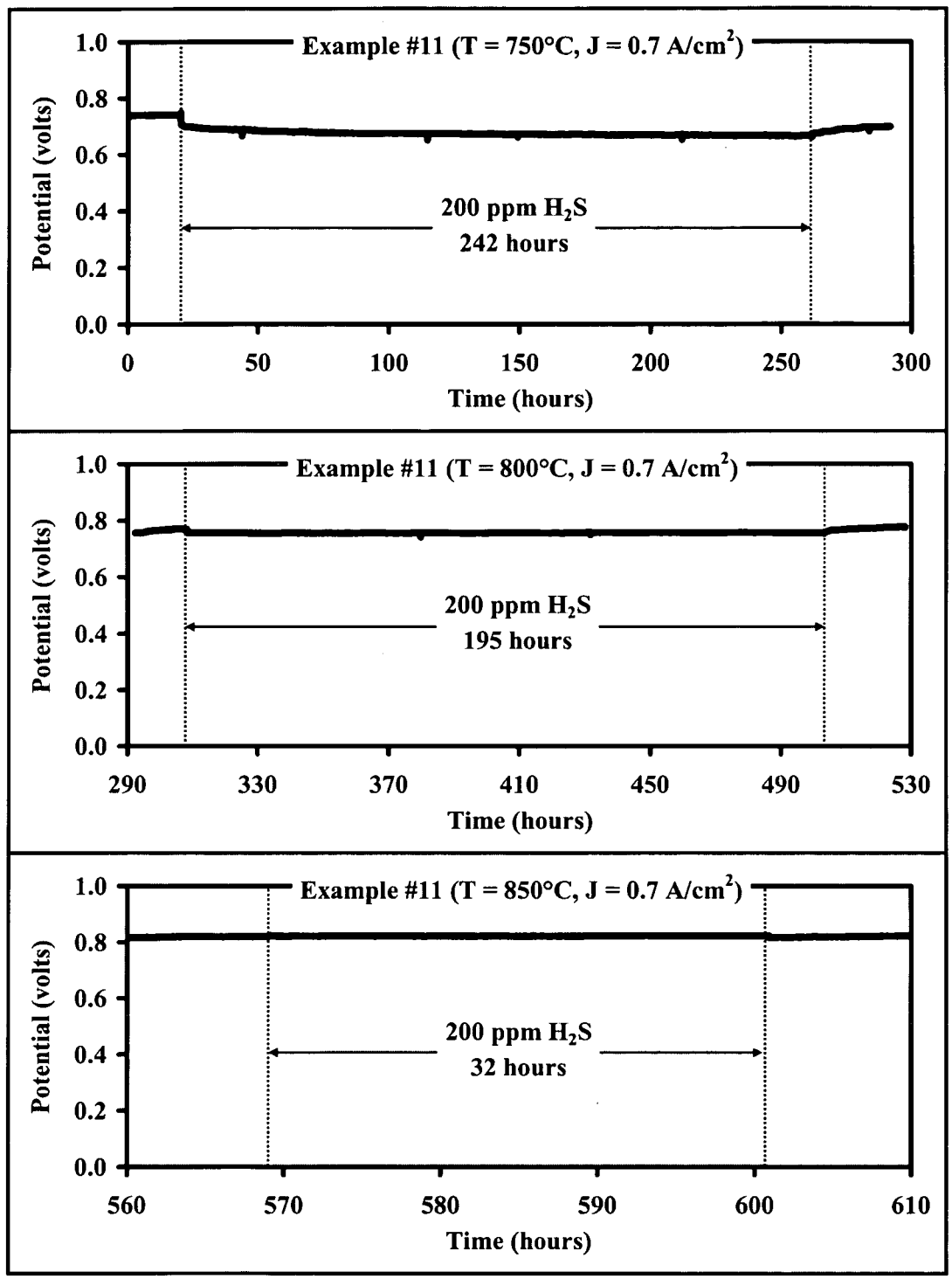
FIG. 12 provides long-term, single-cell SOFC testing data obtained on a large-area FlexCell based solid oxide fuel cell of Example 11, with the high-performance, multilayer anode of one embodiment of the invention, showing the effects of 200 ppm $H_2S$ on voltage stability during constant current testing (0.7 A/cm$^2$) at temperatures of 750, 800 and 850° C.

The SOFC results presented above were obtained using "button-cell" testing methods involving small cells (~1 $cm^2$ in active area) and low fuel use (~2-3 percent). Single-cell SOFC tests were also completed on larger area cells (28 $cm^2$) to allow anode performance to be assessed under realistic conditions. Data presented in FIG. 12 show the effect of operating temperature in tests conducted at 0.7 A/$cm^2$ with fuel use close to 50 percent. At 750° C., a slight decrease in voltage (Stage I degradation) was observed upon introduction of 200 ppm $H_2S$, followed by very slow rate of steady-state (Stage II) degradation over 242 hours of testing. The initial voltage loss was fully recovered when $H_2S$ was removed from the fuel feed. At 800° C., the cell exhibited a very slight (and recoverable) voltage loss and no steady-state deactivation was observed over 195 hours of testing. $H_2S$ had no effect whatsoever on the cell at 850° C. Power densities were 470 mW/$cm^2$ at 750° C., 530 mW/$cm^2$ at 800° C., and 575 mW/$cm^2$ at 850° C. in 200 ppm $H_2S$.

Stabilization of Anode Performance in SOFCs

As stated above, sintering of nickel metal particles within an SOFC anode in the presence of sulfur is presumed to be a mechanism for Stage II deactivation due to the lower melting temperature of nickel sulfide compared to nickel metal. Even in the absence of sulfur, a key degradation mechanisms during steady-state and/or transient operation of solid oxide fuel cells is sintering of the base metal particles in cermet anodes (either pure nickel or nickel alloys containing cobalt, iron and/or copper), with sintering and grain growth of nickel or nickel alloys being particularly problematic during thermal cycling and/or reduction-oxidation (redox) cycling. The present invention solves this problem by providing nanoscale ceramic electrolyte particles resident within the nickel metal or nickel-alloy grains to reduce coarsening during SOFC operation. This may be accomplished, for example, by dispersing a small amount of nanoscale ceramic electrolyte material (either zirconia or ceria based electrolyte materials) into NiO powder (or into other mixed base metal oxide powder mixtures) prior to mixing with additional electrolyte powder during the anode synthesis step. This approach is applicable to most solid oxide fuel cell designs, including traditional anode-supported cells, traditional cathode supported cells, traditional electrolyte-supported cells, and planar cells of the FlexCell and HybridCell designs.

To demonstrate this approach, two planar cells of the Flex-Cell design having active areas of 28 cm² were prepared. One FlexCell was prepared without nanoscale SDC in the base metal component of the electrochemically active anode layer and the other FlexCell was prepared with nanoscale SDC dispersed into the base metal component of the electrochemically active anode layer. Both FlexCells had identical ceria interfacial layers on anode and cathode faces, identical current carrying anode layers, and identical bi-layer cathodes. As will be described in more detail later in this application, the FlexCell having an anode with dispersed nanoscale SDC exhibited superior resistance to degradation during thermal cycling tests.

High-Performance, Multilayer Cathode System

Cathode/Electrolyte Interfacial Layer:

An interfacial layer of a ceria-based electrolyte material with mixed ionic and electronic conductivity and a tailored microstructure is deposited at the cathode/electrolyte interface. The interfacial layer is deposited in two steps, whereby the first step provides a thin dense ceria film on the electrolyte membrane surface and the second step provides a porous ceria film with an intentionally textured surface on the thin dense ceria film. The total ceria interlayer thickness is approximately 2-3 microns. Densification and adhesion of the two ceria interfacial layer coatings during annealing are enhanced via doping with cobalt. The dense portion of the layer changes the nature of the electrolyte surface, leaving only mixed conducting interfaces between the electrolyte and cathode while extending the active electrode area. The porous portion of the interfacial layer increases the volume of triple-phase boundary regions at the cathode/electrolyte interface and reduces resistance to oxygen transport. The ceria interfacial layer also is important because it prevents deleterious reactions between the electrolyte material (zirconia or lanthanum gallate based) and perovskite structured manganite, ferrite and cobaltite based cathode materials during the final annealing step. This allows higher annealing temperatures to be used, which aids in achieving a thermally stable cathode microstructure that does not change during SOFC operation at elevated temperature.

Replacement of LSM with Higher Performance Cathode Materials:

The electrochemical performance of conventional lanthanum strontium manganite (LSM) cathode material in SOFCs for oxygen reduction reactions is fairly limited at temperatures below about 800° C. It would be advantageous to use higher performance electrode materials, such as a lanthanum strontium zinc ferrite, a lanthanum strontium manganite, a lanthanum strontium ferrite (LSF), a lanthanum strontium cobaltite, a lanthanum strontium cobalt ferrite, a barium strontium cobalt ferrite, a lanthanum strontium nickelate, a samarium strontium cobaltite (SSC), other cathode materials known to those skilled in the art, and mixtures thereof, in the active cathode layer. However, these higher performance materials may be used only if their stability under operating conditions (and specifically in the presence of volatilized chromium) can be maintained over several thousands of hours. Of particular interest to the multilayer cathode system of the present invention is zinc-doped lanthanum strontium ferrite (LSZF), which has been described in U.S. Pat. No. 6,946,213. However, the teachings of this disclosure would apply to any ceramic electrode material that can be used as an SOFC cathode. As noted above, the use of the ceria interfacial layers makes the use of these advanced cathode materials more practical.

Bi-Layer Cathode Structure:

A bi-layer cathode structure optimizes the electrochemical and current carrying performance of the cathode system. The electrochemically active layer (deposited onto ceria interfacial layer) is a composite mixture of a ceramic electrode material (e.g., LSM, LSF, LSCF, LSZF, etc.) and a ceria-based electrolyte material (e.g., SDC, GDC, etc.) and has a fine-scale and porous microstructure, while the current collecting cathode layer is a single-phase ceramic electrode with a coarse microstructure and larger-scale porosity to minimize resistance to current and gas flow. The active and current carrying cathode layers are each approximately 15 microns thick. The composition of the ceramic electrode material used for the current carrying layer need not be the same as the composition of the electrode material in the active (composite) cathode layer. For example, one might optimize the composition of the ceramic electrode material in the composite layer for electrochemical activity, and the composition of the current carrying ceramic electrode material for electrical conductivity.

Inclusion of Ceria Electrolyte Phase in Active (Composite) Cathode Layer:

In addition to enhancing cathode performance, replacement of YSZ electrolyte material with ceria based electrolyte material in composite cathodes also allows higher annealing temperatures to be used in conjunction with the incorporation of more reactive (and more electrochemically active) electrode materials (e.g., ferrites, cobaltites and nickelates) into the active (composite) cathode layer.

Figure 13:
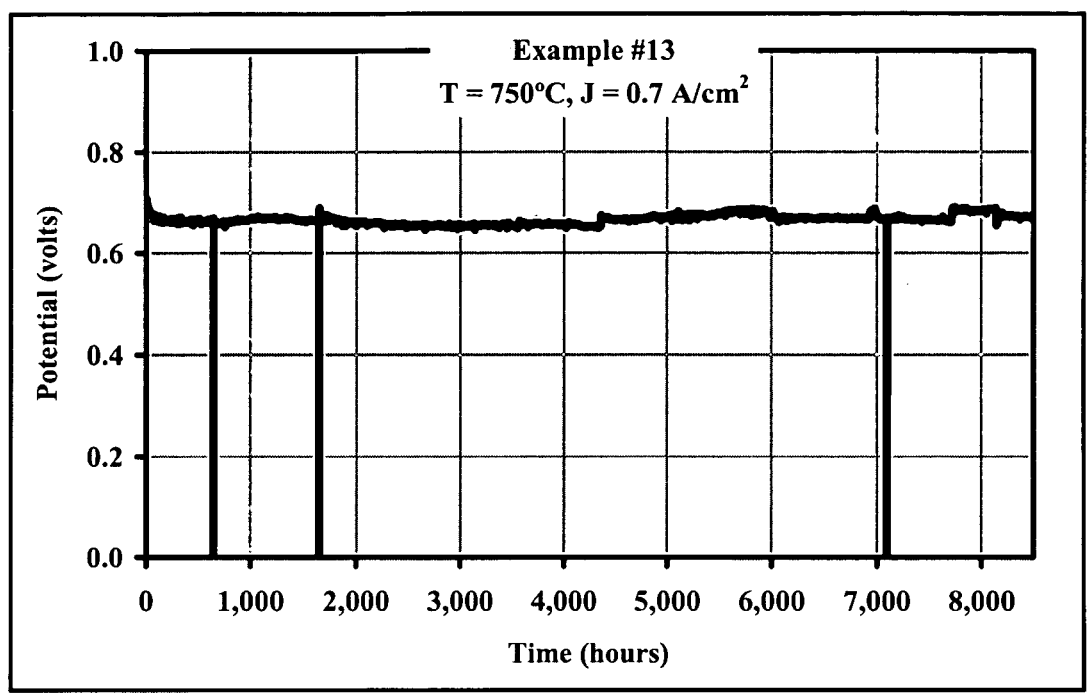
FIG. 13 is a plot of long-term, single-cell testing data obtained on large-area HybridCell based solid oxide fuel cell of Example 13, with a multilayer cathode materials system comprising a cobalt-doped SDC cathode/electrolyte interfacial layer, an electrochemically active (LSZF/GDC/Pd) cathode layer, and a current carrying (LSZF/Pd) cathode layer, demonstrating exceptional voltage stability during constant current testing (0.71 A/cm$^2$) at 750° C.

Incorporation of Palladium as a Dopant in the Cathode Layer:

A novel approach for stabilizing cathode performance against the deleterious effects of chrome evaporation involves doping of the cathode material with a small amount of palladium. The palladium containing cathode layers are deposited using convention methods such as screen printing, spraying, or painting, followed by annealing. To demonstrate this approach, a planar cell of the HybridCell structure was prepared with an active area of 28 cm² and a multilayer cathode was applied, including a ceria interlayer (as described above), an active cathode layer that was a composite of $(La_{0.60}Sr_{0.40})(Fe_{0.90}Zn_{0.10})O_{3-X}$ (LSZF) and gadolinium-doped ceria (GDC), and a current carrying cathode layer of pure LSZF. A palladium addition of one weight percent was made to the active cathode layer and a two weight percent addition of palladium was made to the current collecting cathode layer. This HybridCell was tested using manifolds that were made of a nickel-chrome alloy (Inconel-601). The cell was operated at 750° C. for about a year (8,500) with a humidified hydrogen fuel gas (350 cc/min of $H_2$) being fed to the anode side of the cell and air (1500 cc/min) being fed to the cathode side. As is shown in FIG. 13, with a constant current of 0.71 A/cm² being applied to the cell, there was zero degradation of the voltage after an initial "conditioning" period of about 150 hours (which is attributed to stabilization of the anode microstructure). Without the palladium addition, one might expect degradation of cell performance due to poisoning of the cathode by chromium.

Palladium may be used as a stabilizer against chromium poisoning in SOFC cathodes other than the LSZF doped cathodes used for the above-described demonstration. These cathode compositions may include a lanthanum strontium manganite, a lanthanum strontium ferrite (LSF), a lanthanum strontium cobaltite, a lanthanum strontium cobalt ferrite, a barium strontium cobalt ferrite, a lanthanum strontium nickelate, a samarium strontium cobaltite (SSC), other cathode materials known to those skilled in the art, mixtures thereof, and a mixture of any of them with LSZF. The palladium stabilizer may be incorporated into the cathode layers, for example, by mixing palladium metal or palladium oxide with the cathode powders before preparation of the screen printing ink, incorporating palladium into the cathode material by traditional incipient wetness methods prior to making the screen printing ink, dissolving palladium salts into the screen printing ink vehicle before mixing the cathode powder into the ink vehicle, or infiltrating a solution containing a palladium salt into a pre-formed cathode coating.

The anode materials system of the present invention is described in more detail below. The anode materials system includes a thin interfacial layer of a mixed ionically and electronically conducting ceramic material that is fabricated in two layers. The mixed ionically and electronically conducting ceramic material preferably is selected from a ceria-based electrolyte material, including a samarium-doped ceria, a gadolinium-doped ceria, a yttrium-doped ceria, a scandium-doped ceria, a calcium-doped ceria, and cerium oxide doped with any combination of rare earth and/or alkaline earth elements. These materials may contain dopants in addition to those specified so long as these dopants do not interfere with anode function. Other mixed conducting ceramic electrolyte materials known to those skilled in the art also may be used. For the case of ceria-based interfacial layers, a first dense ceria layer is deposited onto the ceramic electrolyte membrane surface from a mixture of doped cerium oxide electrolyte powders having one or more primary particle size ranges and a small amount of a sintering aid such as cobalt (or alternatively other base metal oxides or a mixture of base metal oxides). The second porous layer is deposited from a doped cerium oxide electrolyte powder having one or more distinct primary particle size ranges, a small amount of a sintering aid such as cobalt (or alternatively other base metal oxides or a mixture of base metal oxides), and a fugitive pore forming material (e.g., graphite or other suitable fugitive materials known to those skilled in the art). The two layers are deposited sequentially and then co-sintered such that the doped cerium oxide interfacial layer is dense at the surface of the electrolyte membrane and porous at the outer surface and the total thickness of the interfacial layer is approximately 2-3 microns. Both of the component layers are deposited from an ink or suspension using methods such as screen printing, spraying, painting, or other methods known to those skilled in the art. The sintering aid (cobalt or other base metal oxide or combination of base metal oxides) may be incorporated during synthesis of the ceria-based powders used to make the interfacial layer, oxide or metal powders may be pre-mixed with ceria-based powders before inks or spray suspensions are made, or the sintering aid may be incorporated during the ink/suspension synthesis step by pre-dissolving soluble precursors to the sintering aid in the ink vehicle (or solvent) that is used to apply the coatings by spraying or screen printing methods. Other approaches to incorporate sintering aids to the ceria interfacial layer also may be used.

The anode materials system of the present invention also includes a bi-layer anode structure such that the electrochemical and current carrying functions of the anode system are separately optimized. The electrochemically active anode layer is first deposited onto the ceria interfacial layer from mixtures of a ceria-based electrolyte powder and a suitable base metal oxide powder (e.g., nickel oxide) or a combination of pre-calcined base metal oxide powders (e.g., nickel, cobalt, copper and/or iron oxides). The ceria-based electrolyte material in the mixture used to make the electrochemically active layer may be selected from a samarium-doped ceria, a gadolinium-doped ceria, a yttrium-doped ceria, a scandium-doped ceria, a calcium-doped ceria, and cerium oxide doped with any combination of rare earth and/or alkaline earth elements. These materials may contain dopants in addition to those specified so long as these dopants do not interfere with anode function. The base metal oxide powder in the mixtures used to make the electrochemically active anode layer is comprised of one or more distinct particle size ranges. The ceria-based ceramic electrolyte powder in the mixtures used to make the electrochemically active anode layer also is comprised of one or more distinct particle size ranges. The weight ratio of base metal oxide powder to doped cerium oxide powder in the mixtures used to make the electrochemically active anode layer can range from 1:1 to 3:1. The current collecting anode layer is deposited onto the electrochemically active anode layer from mixtures of a ceramic electrolyte powder (e.g., doped zirconium oxide or doped cerium oxide) and a base metal oxide (e.g., nickel oxide) or combination of base metal oxides (e.g., nickel, cobalt, copper and/or iron oxides). The base metal oxide powders used in the current carrying anode layer are comprised of one or more distinct primary particle size ranges, and the weight ratio of base metal oxide powder to doped cerium oxide powder can range from 3:1 to 5:1. The two types of anode layers are deposited and then sintered such that the total thickness is approximately 30 microns and each of the component anode layers is approximately 15 microns thick. In one embodiment of the invention in which a mixture of base metal oxides (e.g., nickel, cobalt, iron and/or copper) is used, the oxides may be pre-calcined to form a solid solution, a single phase mixed oxide, or a multiple-phase mixed oxide prior to modifying particle size and mixing with the electrolyte material (ceria or zirconia). The ceria-based anode/electrolyte interfacial layer, the first (electrochemically active) anode layer and the second (current carrying) anode layer may be deposited and sintered separately or they may be deposited sequentially and then co-sintered.

A small amount of a high surface area, nanoscale electrolyte material (either zirconia or ceria based electrolyte materials) may be mixed into either nickel oxide or a mixture of base metal oxides (nickel, cobalt, iron and/or copper oxides) and then calcined before the calcined mixture is mixed with additional electrolyte material to form a cermet anode. The nanoscale electrolyte material addition prevents sintering of base metal particles during SOFC operation, during operation with sulfur containing fuels, during start-up and shut-down, and during reduction-oxidation cycling. If doped cerium oxide is used as the nanoscale electrolyte material, then the composition of the nanoscale doped cerium oxide material may be selected from a samarium-doped ceria, a gadolinium-doped ceria, a yttrium-doped ceria, a scandium-doped ceria, a calcium-doped ceria, and a cerium oxide doped with any combination of rare earth and/or alkaline earth elements. These materials may contain dopants in addition to those specified so long as these dopants do not interfere with anode function. If doped zirconium oxide is used as the nanoscale electrolyte material, then the composition of the nanoscale doped zirconia electrolyte material may be a yttrium-doped zirconia, a scandia doped zirconia, and any singly or multiply doped zirconia electrolyte material.

The cathode materials system of the present invention includes a thin interfacial layer of a mixed ionically and electronically conducting ceramic material which is fabricated in two layers. The mixed ionically and electronically conducting ceramic material preferably is selected from a ceria-based ceramic electrolyte material, including a samarium-doped ceria, a gadolinium-doped ceria, a yttrium-doped ceria, a scandium-doped ceria, a calcium-doped ceria, and a cerium oxide doped with any combination of rare earth and/or alkaline earth elements. These materials may contain dopants in addition to those specified so long as these dopants do not interfere with cathode function. Other mixed conducting ceramic electrolyte materials known to those skilled in the art also may be used. For the case of ceria-based interfacial layers, a first dense ceria layer is deposited onto the ceramic electrolyte membrane surface from a mixture of doped cerium oxide electrolyte powders having one or more primary particle size ranges and a small amount of a sintering aid such as cobalt (or alternatively other base metal oxides or a mixture of base metal oxides). The second porous layer is deposited from a doped cerium oxide electrolyte powder having one or more distinct primary particle size ranges, a small amount of a sintering aid such as cobalt (or alternatively other base metal oxides or a mixture of base metal oxides), and a fugitive pore forming material (e.g., graphite or other suitable fugitive materials known to those skilled in the art). The two component layers of the bi-layer interfacial layer are deposited sequentially and then co-sintered such that doped cerium oxide interfacial layer is dense at the surface of the electrolyte membrane and porous at the outer surface and the total thickness of the interfacial layer is approximately 2-3 microns. Both of the component layers are deposited from an ink or suspension using methods such as screen printing, spraying, painting, or other methods known to those skilled in the art. The sintering aid (cobalt or other base metal oxide or combination of base metal oxides) may be incorporated during synthesis of the ceria-based powders used to make the interfacial layer by pre-mixing the oxide or metal powders ceria-based powders before inks or spray suspensions are made or incorporating the sintering during the ink/suspension synthesis step by pre-dissolving soluble precursors to the sintering aid oxides in the ink vehicle (or solvent) used to apply the interfacial layer by spraying or screen printing methods. Other approaches to incorporate the sintering aid into the ceria-based interfacial layer also may be used.

The cathode materials system of the present invention also includes a bi-layer cathode structure such that the electrochemical and current carrying functions of the anode system are separately optimized. The electrochemically active cathode layer is first deposited onto the ceria-based interfacial layer from powder mixtures of a ceria-based ceramic electrolyte material and a ceramic electrode material. The ceramic electrode material may be a lanthanum strontium zinc ferrite (LSZF), a lanthanum strontium manganite, a lanthanum strontium ferrite (LSF), a lanthanum strontium cobaltite, a lanthanum strontium cobalt ferrite, a barium strontium cobalt ferrite, a lanthanum strontium nickelate, a samarium strontium cobaltite (SSC), other cathode materials known to those skilled in the art, and a mixture thereof; these materials may contain dopants in addition to those specified so long as these dopants do not interfere with cathode function. The ceramic electrode powder in the mixtures used to make the electrochemically active cathode layer is comprised of one or more distinct particle size ranges. The ceria-based electrolyte powder in the mixtures used to make the electrochemically active cathode layer also is comprised of one or more distinct particle size ranges. The weight ratio of ceramic electrode powder to doped cerium oxide powder in the mixtures used to make the electrochemically active cathode layer can range from 1:2 to 2:1. The current collecting cathode layer is either a single-component ceramic electrode material or a ceramic electrode material that is mixed with a small amount of electrolyte material; this layer is deposited onto the electrochemically active cathode layer. The composition of the ceramic electrode material used in the current carrying cathode layer may the same as that used in the electrochemically active cathode layer, or optionally be a different ceramic electrode material selected based on reasons of higher electrical conductivity, better thermal stability, or improved thermal expansion match with the structural component of the cell (e.g., a zirconia based electrolyte for the case of the FlexCell and HybridCell structures). The ceramic electrode material used in the current carrying cathode layer is comprised of one or more distinct particle size ranges. The two types of cathode layers are deposited and then sintered such that the total thickness is approximately 30 microns and each of the component anode layers is approximately 15 microns thick. In one embodiment of the invention, a palladium dopant (or other base metal or precious metal dopant, or any combination of base metal and precious metal dopants) may be incorporated into at least one of the cathode layers. This dopant addition may be made by re-dissolving precursors to the dopant (e.g., acetylacetonates or other soluble compounds) into the ink vehicle (or solvent) that is used to apply the coatings. The ceria-based cathode/electrolyte interfacial layer, the first (electrochemically active) cathode layer and the second (current carrying) cathode layer may be deposited and sintered separately or they may be deposited sequentially and then co-sintered.

The usefulness of the electrode materials systems described in this invention are evident from the testing results obtained on solid oxide fuel cells prepared as described in the following Examples.

Example 1

Figure 14:
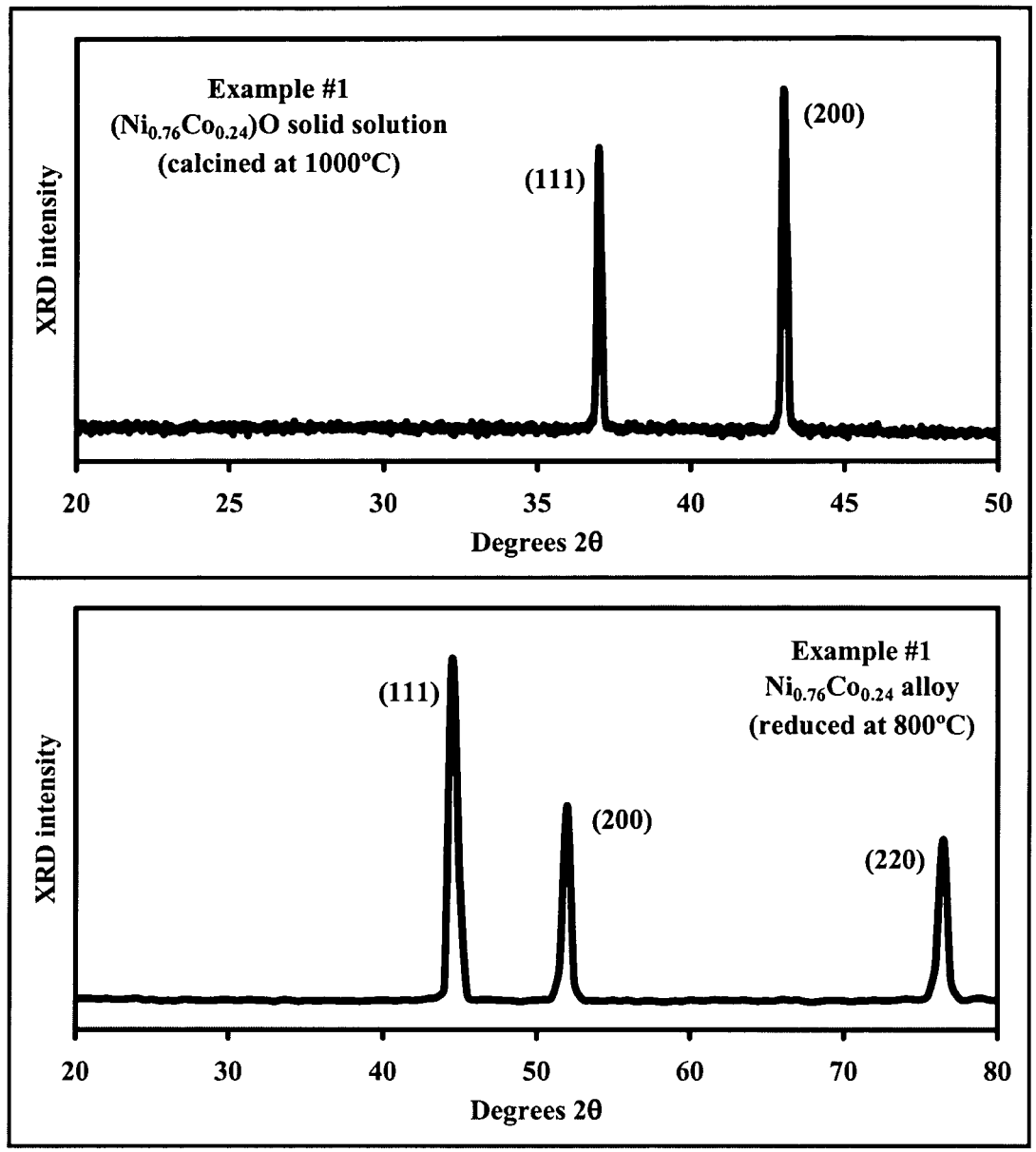
FIG. 14 is a comparison of x-ray diffraction patterns of calcined $(Ni_{0.76}Co_{0.24})O$ solid solution powder and the reduced $Ni_{0.76}Co_{0.24}$ alloy powder of Example 1.

Nickel cobalt oxide solid solution powder was prepared for subsequent use in anode formulations described in Examples 5, 6, 11, 12, 14, 16, and 17. The first step was the preparation of a mixture that contained 112.5 grams nickel oxide (NiO) and 37.50 grams cobalt oxide ($Co_3O_4$), corresponding to a batched stoichiometry of $(Ni_{0.76}Co_{0.24})O$. This mixture was ball milled in acetone with zirconia grinding media and the resulting slurry was dried to a powder. The dried powder mixture was calcined at 1000° C. and then sieved through a 35-mesh sieve. During calcination, the nickel and cobalt oxides reacted to form a $(Ni_{0.76}Co_{0.24})O$ solid solution powder, as confirmed by x-ray diffraction data in FIG. 14. To determine the effect of reduction on the crystal structure, a sample of the calcined $(Ni_{0.76}Co_{0.24})O$ powder was reduced in hydrogen at 800° C. and analyzed by x-ray diffraction (also shown in FIG. 14). These XRD data confirm that the reduced powder is an alloy of nickel and cobalt metals rather than a mixture of nickel and cobalt metals.

The calcined NiO—CoO powder prepared above constituted the "coarse" fraction of NiO—CoO precursor powder. Fine NiO—CoO precursor powder was made by the same initial procedure but after calcination the NiO—CoO powder was vibratory milled in acetone with zirconia grinding media to reduce its particle size. The vibratory milled NiO—CoO slurry then was dried to complete the preparation of "fine" NiO—CoO precursor powder.

Example 2

NiO—CoO solid solution powder ($Ni_{0.76}Co_{0.24}O$) containing a small amount of nanoscale samarium-doped ceria (SDC-15, $Ce_{0.85}Sm_{0.15}O_{1.925}$) was prepared for subsequent use in anode formulations described in Examples 6, 8, 10, 11, and 15. The first step was the preparation of a mixture that contained 112.5 grams nickel oxide (NiO), 37.50 grams cobalt oxide ($Co_3O_4$), and 3 grams nanoscale SDC-15 powder having a surface area of 195 $m^2$/gram. This mixture was ball milled in acetone with zirconia grinding media and the resulting slurry was dried to a powder. The dried NiO—CoO/SDC powder was calcined at 1000° C. then sieved through a 35-mesh sieve to complete preparation of the coarse NiO—CoO/SDC precursor powder. Fine NiO—CoO/SDC precursor powder was made by the same initial procedure but after calcination the NiO—CoO/SDC powder was vibratory milled in acetone with zirconia grinding media to reduce its particle size. The vibratory milled NiO—CoO/SDC slurry then was dried to complete preparation of the fine NiO—CoO/SDC precursor powder.

Example 3

NiO—CoO solid solution powder ($Ni_{0.76}Co_{0.24}O$) containing small amounts of nanoscale samarium-doped ceria (SDC-15) and nanoscale zirconium-doped ceria (ZDC-50, $Ce_{0.5}Zr_{0.5}O_2$) powders was prepared for subsequent use in an anode formulation described in Example 9. The first step was the preparation of a mixture that contained 112.5 grams nickel oxide (NiO), 37.50 grams cobalt oxide ($Co_3O_4$), 1.5 grams nanoscale SDC-15 powder with a surface area of 195 $m^2$/gram, and 1.5 grams nanoscale ZDC-50 powder with a surface area of 81 $m^2$/gram. This mixture was ball milled in acetone with zirconia grinding media and the resulting slurry was dried to a powder. The dried powder mixture then was calcined at 1000° C. then sieved through a 35-mesh sieve. The calcined NiO—CoO/SDC/ZDC powder constituted the coarse NiO—CoO/SDC/ZDC precursor powder. Fine NiO—CoO/SDC/ZDC precursor powder was made by the same initial procedure but after calcination the NiO—CoO/SDC powder was vibratory milled in acetone with zirconia grinding media to reduce its particle size. The vibratory milled NiO—CoO/SDC/ZDC slurry then was dried to complete preparation of the fine NiO—CoO/SDC/ZDC precursor powder.

Example 4

A solid oxide fuel cell was prepared from a 1.9-cm diameter scandia-stabilized zirconia ceramic electrolyte substrate with a thickness of approximately 125 microns and an active area of 1.26 $cm^2$. The cell was fabricated by screen printing a single-layer, cobalt-doped samarium-doped ceria (SDC-20, 20 mole percent samarium) interfacial layer on both the anode and cathode faces. The cobalt addition was made by adding cobalt (III) 2,4 pentanedionate to the ink in an amount corresponding to approximately 1 wt % cobalt metal relative to the amount of SDC-20 powder in the ink. The cobalt-doped SDC interfacial layers were annealed at 1300° C. for one hour. Thicknesses of the interfacial layers on both anode and cathode faces were approximately five microns. A bi-layer anode was deposited onto the cobalt doped SDC interfacial layer on the anode face of the cell. The electrochemically active anode layer comprised a mixture of NiO and gadolinium-doped ceria (GDC-10, 10 mole percent Gd), with 50 wt % GDC-10 and 50 wt % NiO. The current carrying anode layer comprised a mixture of NiO and GDC-10, with 20 wt % GDC-10 and 80 wt % NiO. The two anode layers were annealed at 1300° C. for one hour. Thicknesses of the electrochemically active and current carrying anode layers after annealing both were approximately 15 microns each. A bi-layer cathode, based on zinc-doped lanthanum strontium ferrite, ($La_{0.60}Sr_{0.40}$)($Zn_{0.10}Fe_{0.90}$)$O_{3-x}$ (LSZF) was deposited onto the cobalt-doped SDC interfacial layer on the cathode face of the cell. The electrochemically active cathode layer comprised a mixture of LSZF and GDC-10 (50 wt % LSZF and 50 wt % GDC-10). The current carrying cathode layer was pure LSZF. The two cathode layers were annealed at 1125° C. for one hour. Thicknesses of the electrochemically active and current carrying cathode layers after annealing both were approximately 15 microns each.

Figure 5:
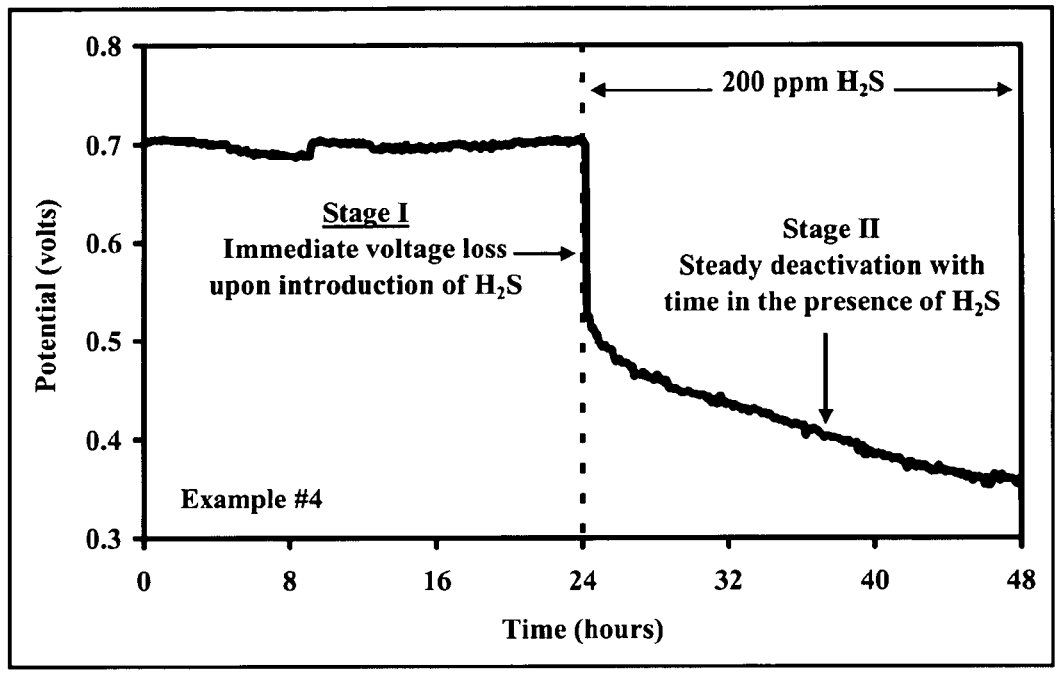
FIG. 5 is a plot of SOFC data obtained at 750° C. for the solid oxide fuel cell of Example 4 having a cobalt-doped SDC interlayer and a conventional Ni/GDC anode, showing two modes of deactivation caused by the introduction of $H_2S$.
Figure 10:
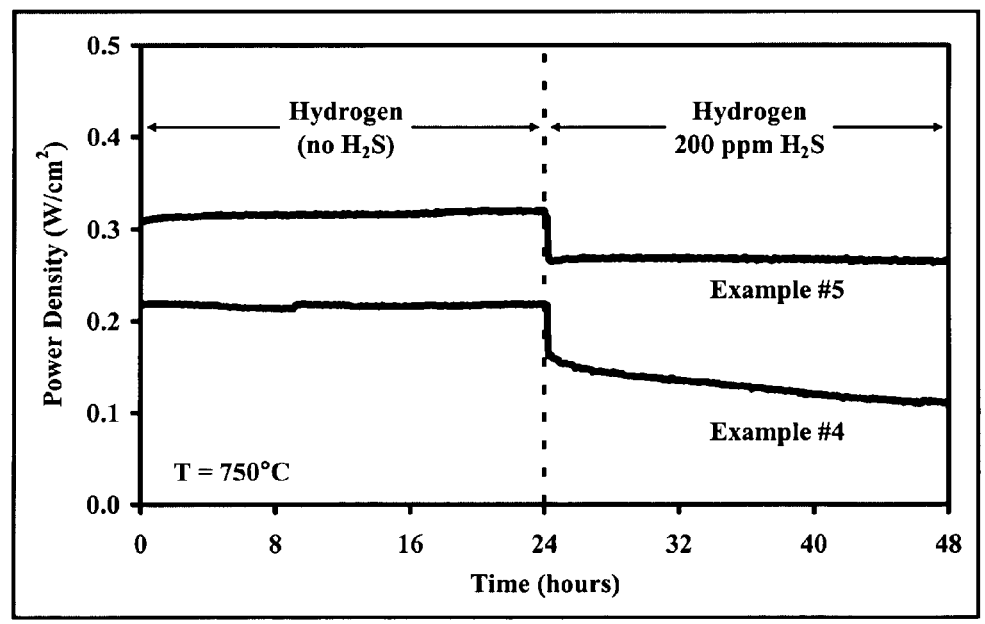
FIG. 10 is a comparison of button-cell SOFC data obtained at 750° C. for electrolyte-supported solid oxide fuel cells with the same LSM-based cathode system and different anodes: the solid oxide fuel cell of Example 4 having a cobalt-doped SDC anode/electrolyte interfacial layer and a Ni/GDC anode; and the solid oxide fuel cell of Example 5 having a cobalt-doped SDC anode/electrolyte interfacial layer and a Ni—Co/GDC anode.

The SOFC performance of this cell in the presence of 200 ppm $H_2S$ at 750° C. is shown in FIGS. 5 and 10. Because the anode in this cell did not contain cobalt, it experienced significant steady-state (Stage II) degradation in the presence of sulfur.

Example 5

A solid oxide fuel cell was prepared from a 1.9-cm diameter scandia-stabilized zirconia ceramic electrolyte substrate with a thickness of approximately 125 microns and an active area of 1.26 $cm^2$. The cell was fabricated with the same cobalt-doped samarium-doped ceria (SDC) interfacial layers on both the anode and cathode faces as described in Example 4. A bi-layer anode was deposited onto the cobalt doped SDC interfacial layer on the anode face of the cell. The electrochemically active anode layer comprised a mixture of 40 wt % gadolinium-doped ceria (GDC) and 60 wt % coarse NiO—CoO powder prepared as described in Example 1. The current carrying anode layer comprised a mixture of NiO and GDC (80 wt % NiO and 20 wt % GDC). The two anode layers were annealed at 1300° C. for one hour. Thicknesses of the electrochemically active and current carrying anode layers after annealing both were approximately 15 microns each. The same LSZF-based bi-layer cathode as described in Example 4 was deposited and annealed onto the cobalt-doped SDC interfacial layer on the cathode face of the cell.

The SOFC performance of this cell in the presence of 200 ppm $H_2S$ is shown in FIG. 10. Because the anode in this cell contained cobalt, it experienced lower steady-state degradation in the presence of sulfur, compared to the identical cell without cobalt in the electrochemically active anode layer (Example 4).

Example 6

A solid oxide fuel cell was prepared from a 1.9 cm diameter disc-shaped FlexCell substrate made from scandia-stabilized zirconia (ScSZ-6, six mole percent $Sc_2O_3$) electrolyte material with an active area of 0.89 $cm^2$. The cell was fabricated with cobalt-doped SDC interfacial layers on both the anode and cathode faces, with a bi-layer anode on the anode face, and with a bi-layer cathode on the cathode face. This cell was fabricated as described below:

Deposition of Interfacial Layer Coatings: Cobalt-doped SDC interfacial layer coatings were prepared according to the spray deposition methods taught in U.S. patent application Ser. No. 11/349,773 (published Aug. 9, 2007). Cobalt-doped SDC interfacial layer ink was prepared using samarium-doped ceria powders of the composition ($Ce_{0.80}Sm_{0.20})O_{0.90}$ (SDC-20). The ink was prepared by dispersing SDC-20 powders into a terpineol based an ink vehicle. The SDC-20 powders in this ink had four different surface areas: 30 percent with a surface area of 6.0 $m^2$/gram, 40 percent with a surface area of 9.3 $m^2$/gram, 20 percent with a surface area of 27 $m^2$/gram, and 10 percent with a surface area of 45 $m^2$/gram. A cobalt addition was made by adding cobalt (III) 2,4 pentanedionate in an amount corresponding to approximately one percent of cobalt metal relative to the total amount of SDC-20 powder in the ink. The cobalt-doped SDC interfacial layer ink was then made into two separate spray solutions. The first solution was prepared by diluting a portion of the SDC/Co ink with acetone and the second solution was prepared by diluting a portion of SDC/Co ink with acetone and adding 2.5 wt % graphite (solids basis). These solutions were sprayed onto both sides of the FlexCell substrate. A first cobalt-doped coating (without graphite) was spray deposited onto one face of the FlexCell substrate and dried and then the SDC/Co/C coating (with graphite) was spray deposited onto the first coating in the same manner and dried. The procedure was repeated to deposit a two-layer ceria interfacial layer onto the opposite face of the FlexCell substrate. The interfacial layer coated FlexCell substrate then was heated in a furnace to 1300° C. for one hour to sinter the interfacial layer coatings and adhere them to the FlexCell substrate. Spray deposition parameters were controlled such that the total interfacial layer thickness was approximately 2-3 microns and each component layer of the interfacial layer was approximately 1-2 microns thick.

Preparation of Electrochemically Active Anode Ink. NiO—CoO/Sdc Anode Precursor powder prepared as described in Example 2 was used to prepare electrochemically active anode inks as follows. Samarium-doped ceria powder of the composition $(Ce_{0.9}Sm_{0.10})O_{1.95}$ (SDC-10) was prepared with different surface areas. A mixture was prepared that contained 30 grams coarse NiO—CoO/SDC precursor powder, 30 grams fine NiO—CoO/SDC precursor, 35 grams SDC-10 powder with a surface area of 6.0 $m^2$/gram, and 5 grams SDC-10 powder with a surface area of 45 $m^2$/gram. This powder mixture then was ball milled in acetone with zirconia grinding media and dried. A portion of this powder was dispersed into a terpineol based ink vehicle to prepare the electrochemically active anode ink.

Preparation of Current Carrying Anode Ink. NiO—CoO Anode Precursor Powder Prepared as described in Example 1 was used to prepare current carrying anode inks as follows. A mixture was then prepared that contained 50 grams coarse NiO—CoO precursor powder, 50 grams fine NiO—CoO precursor, and 25 grams scandia-stabilized zirconia powder (ScSZ, 10 mole percent $Sc_2O_3$, 3-5 micron particle size). This powder mixture then was ball milled in acetone with zirconia grinding media and the resulting slurry was dried to a powder. A portion of this powder was dispersed into a terpineol based ink vehicle to prepare the NiO—CoO/ScSZ current carrying anode ink.

Deposition of Anode Coatings. The two-layer anode was applied to the anode face of the interfacial-layer-coated FlexCell prepared above. The first, electrochemically active (NiO—CoO/SDC), anode layer was applied by painting onto the sintered interfacial layer using a foam brush followed by drying. The second, current carrying (NiO—CoO/ScSZ), anode layer was applied by painting onto the dried electrochemically active anode coating using a foam brush followed by drying. The anode-coated FlexCell substrate then was heated in a furnace to 1300° C. to sinter the anode layers and adhere them to the ceria interfacial layer. The amounts of deposited anode coatings were controlled such that the total anode thickness was approximately 30 microns and each component layer of the bi-layer anode was approximately 15 microns thick.

Preparation of Electrochemically Active Cathode Ink. Gadolinium-Doped Ceria Powder of the composition $(Ce_{0.9}Gd_{0.10})O_{1.95}$ (GDC-10) was prepared with different surface areas. Zinc-doped lanthanum strontium ferrite of the composition $(La_{0.60}Sr_{0.40})(Zn_{0.10}Fe_{0.90})O_{3-X}$ (LSZF) powder was prepared with different surface areas. A mixture was prepared that contained 125 grams LSZF powder with a surface area of 1.6 $m^2$/gram, 125 grams LSZF powder with a surface area of 4.2 $m^2$/gram, 50 grams GDC-10 powder with a surface area of 2.9 $m^2$/gram, and 200 grams GDC-10 powder with a surface area of 8.3 $m^2$/gram. This powder mixture then was ball milled in acetone with zirconia grinding media and the resulting slurry was dried to a powder. A portion of this powder was dispersed into an ink vehicle along with an amount of palladium 2/4 pentanedionate sufficient to make a 0.35 wt % palladium (relative to total solids in the ink) to complete preparation of the electrochemically active cathode ink.

Preparation of Current Carrying Cathode Ink. Zinc-Doped Lanthanum Strontium Ferrite of the composition $(La_{0.60}Sr_{0.40})(Zn_{0.10}Fe_{0.90})O_{3-X}$ (LSZF) powder was prepared with two different surface areas. A mixture was prepared that contained 375 grams LSZF powder with a surface area of 2.2 $m^2$/gram and 125 grams LSZF powder with a surface area of 4.8 $m^2$/gram. This powder mixture then was ball milled in acetone with zirconia grinding media and the resulting slurry was dried to a powder. A portion of this powder was dispersed into an ink vehicle, along with an amount of palladium 2/4 pentanedionate sufficient to make a 0.70 wt % palladium (relative to total solids in the ink), to complete preparation of the current carrying cathode ink.

Deposition of Cathode Coatings. The two-layer cathode was applied to the cathode face of the interfacial-layer-coated FlexCell prepared above (after anode deposition and sintering). The first, electrochemically active (LSZF/GDC/Pd), cathode layer was applied by painting onto the sintered interfacial layer using a foam brush and then dried. The second, current carrying (LSZF/Pd), cathode layer was applied by painting onto the dried electrochemically active cathode coating using a foam brush and then dried. The cathode-coated FlexCell substrate then was heated in a furnace to 1125° C. to sinter the cathode layers and adhere them to the ceria interfacial layer. The amounts of deposited cathode coatings were controlled such that the total cathode thickness was approximately 30 microns and each component layer of the bi-layer cathode was approximately 15 microns thick.

Figure 15:
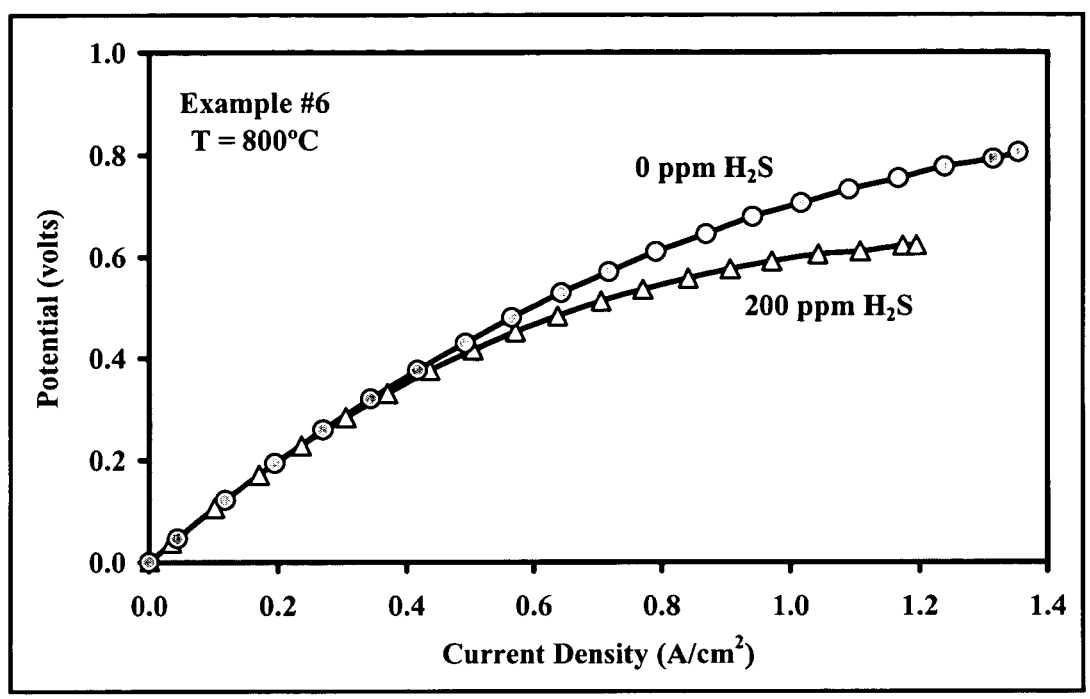
FIG. 15 is a comparison of button-cell SOFC data obtained at 800° C. for the FlexCell based solid oxide fuel cell of Example 6, showing the effect of 200 ppm $H_2S$ on power density versus current density curves.

The SOFC performance of this cell with hydrogen and air as fuel and oxidant (without $H_2S$ in the fuel) was measured using button-cell testing methods. The effect of 200 ppm $H_2S$ on the SOFC performance (current density versus power density curves) at 800° C. for this cell is shown in FIG. 15, which further suggests a relatively low degradation in SOFC performance when $H_2S$ is present in the fuel. Based these and previously presented data (shown in FIGS. 6, 9 and 11), it can be concluded that this cell, which contains anode and cathode materials of the present invention, exhibits the remarkable combination of high SOFC performance and resistance to degradation by sulfur.

Example 7

A solid oxide fuel cell was prepared from a 1.9 cm diameter disc-shaped FlexCell substrate made from ScSZ-6 electrolyte material with an active area of 0.89 $cm^2$. A conventional Ni/YSZ anode was applied to the anode face without an interfacial layer and a cobalt-doped ceria interfacial layer and a bi-layer cathode were applied to the cathode face. This cell was fabricated as described below:

Deposition of Cathode/Electrolyte Interfacial Layer: Cobalt-doped SDC interfacial layer inks were prepared and a bi-layer interfacial layer was applied to the cathode face of a FlexCell substrate using the same materials and methods as described in Example 6.

Preparation of NiO/YSZ Anode Ink. Fine NiO anode precursor powder was made by vibratory milling of nickel oxide powder (NiO, Novamet Standard Type) in acetone with zirconia grinding media, followed by drying. A mixture was prepared that contained 50 grams non-milled nickel oxide powder (NiO, Novamet Standard Type), 50 grams fine NiO precursor, and 25 grams yttria-stabilized zirconia powder (YSZ, 8 mole percent $Y_2O_3$, 3-5 micron particle size). This mixture was ball milled in acetone with zirconia grinding media and the resulting slurry was dried to a powder. A portion of this powder was dispersed into a terpineol based ink vehicle to prepare the NiO/YSZ anode ink.

Deposition of Ni/YSZ Anode Coating. The NiO/YSZ anode was applied to the non-interfacial-layer coated anode face of the FlexCell prepared above. This coating was applied by painting directly onto the substrate using a foam brush, followed by drying. The anode-coated FlexCell substrate then was heated in a furnace to 1300° C. for one hour to sinter and adhere the cobalt-doped ceria interfacial layer that was previously applied to the cathode face of the FlexCell substrate and to sinter and adhere the anode layer. The amount of anode coating applied was controlled such that the total anode thickness was approximately 20 microns.

Deposition of Bi-Layer Cathode Coatings. Electrochemically active (LSZF/GDC/Pd) and current carrying (LSZF/Pd) cathode inks were prepared and cathode coatings were deposited onto the ceria interfacial layer on the cathode face of the FlexCell using the same materials, methods and thermal treatments as described in Example 6.

Figure 6:
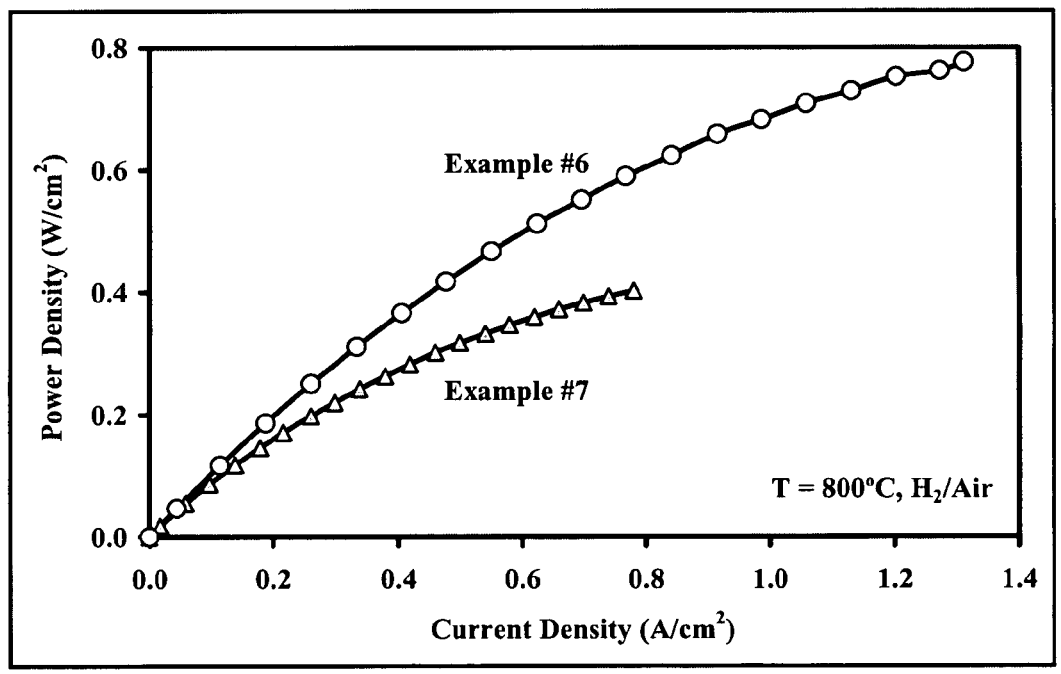
FIG. 6 is a comparison of button-cell SOFC data obtained at 800° C. for FlexCell based solid oxide fuel cells of Examples 6 and 7, showing the performance advantages obtained by replacing the conventional Ni/YSZ anode with the high-performance, multilayer anode system of the present invention.
Figure 7:
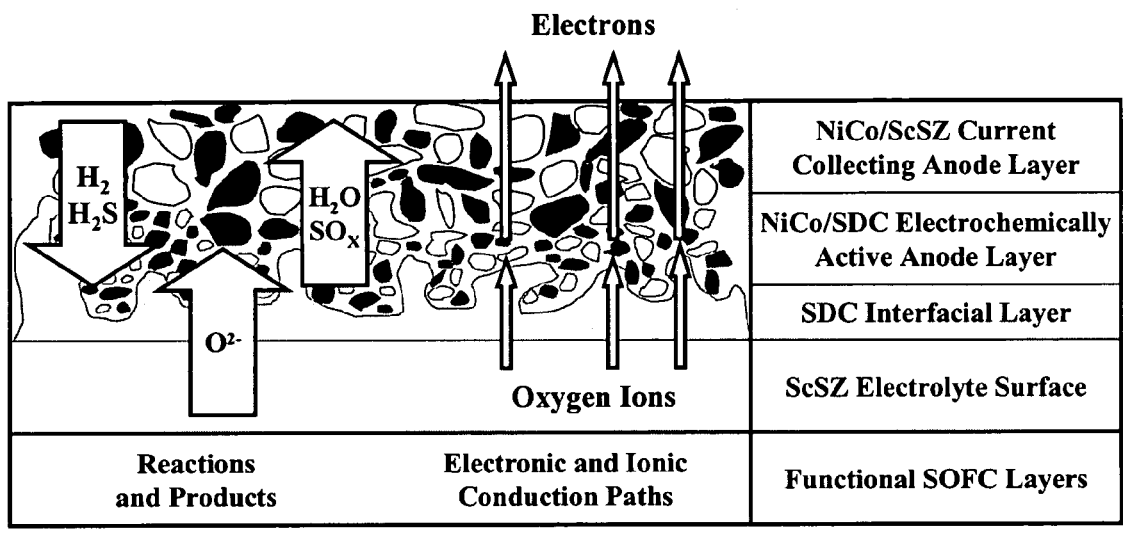
FIG. 7 is a schematic diagram of the high-performance and sulfur-tolerant anode design of the present invention.
Figure 11:
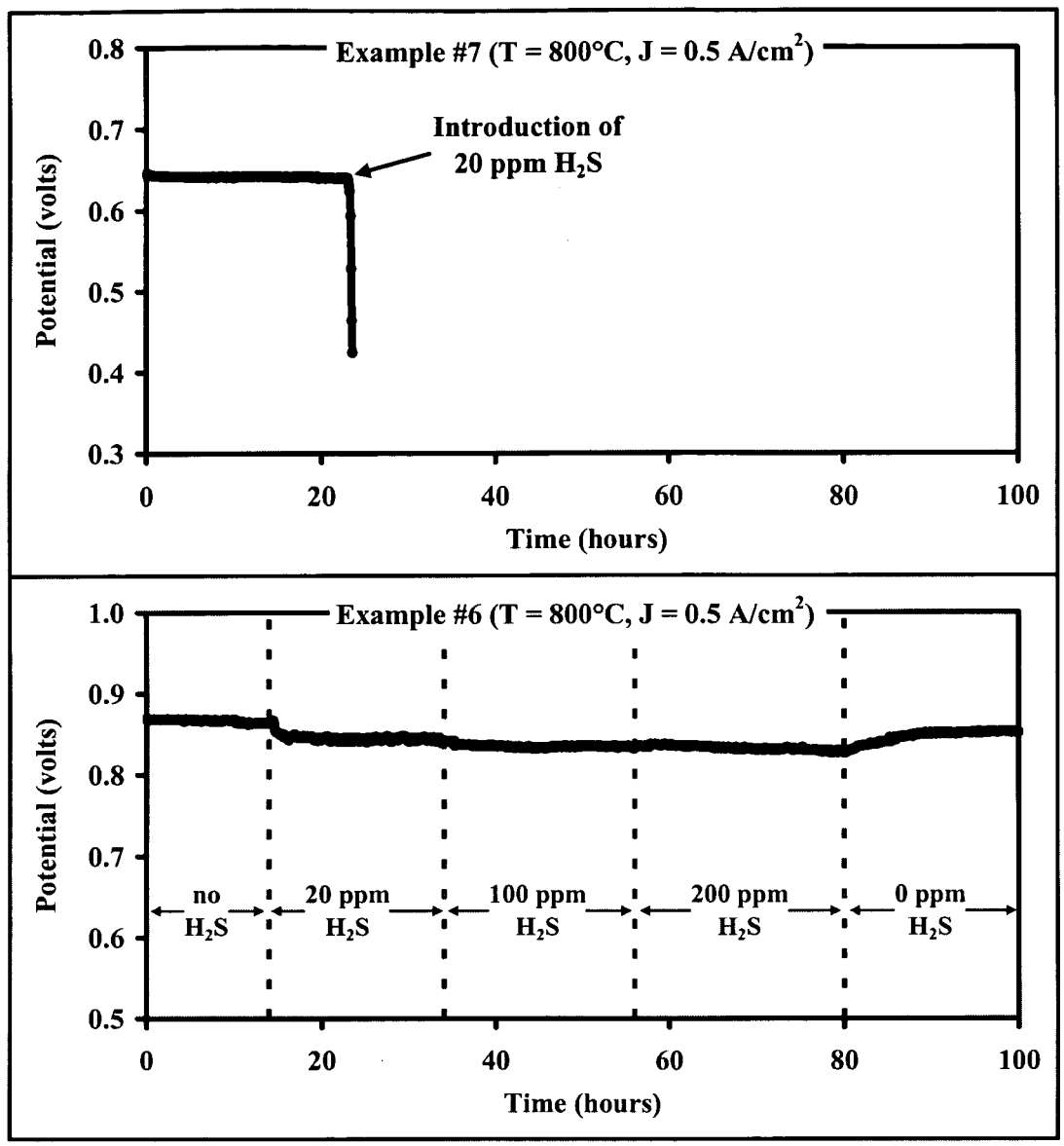
FIG. 11 is a comparison of button-cell SOFC data obtained at 800° C. for FlexCell based solid oxide fuel cells having identical LSZF-based cathodes and different anodes, which shows the effects of varying amounts of $H_2S$ (0-200 ppm) on voltage stability of cells operating at 800° C. with a constant current density of 0.5 A/cm$^2$: the solid oxide fuel cell of Example 7 having a traditional Ni/YSZ anode and not having a ceria interfacial layer (top); and the solid oxide fuel cell of Example 6 having a cobalt-doped SDC anode/electrolyte interfacial layer, a Ni—Co/SDC active anode layer, and a Ni—Co/ScSZ current carrying anode layer (bottom).

The SOFC performance of this cell with hydrogen and air as fuel and oxidant (without $H_2S$ in the fuel) was measured using button-cell testing methods and is shown in FIG. 6. The adverse effect of 20 ppm $H_2S$ on cell voltage during constant current (0.5 A/cm$^2$) SOFC testing is shown in FIG. 11. Based on these data, it can be concluded that this cell, without a ceria interfacial layer and with a conventional NiO/YSZ anode, exhibits relatively low SOFC performance and degrades rapidly when sulfur is present in the fuel.

Example 8

A solid oxide fuel cell was prepared from a 1.9 cm diameter disc-shaped FlexCell substrate made from ScSZ-6 electrolyte material with an active area of 0.89 cm$^2$. This cell was the same as Example 6, except that there was no cobalt in the current carrying layer of the bi-layer anode. This cell was fabricated as described below:

Deposition of Interfacial Layer Coatings: Cobalt-doped SDC interfacial layer inks were prepared and interfacial layers were applied to both the anode and cathode faces of a FlexCell substrate using the same materials, methods and thermal treatments as described in Example 6.

Preparation of Current Carrying Anode Ink. Fine NiO anode precursor powder was made by vibratory milling of nickel oxide (NiO, Novamet Standard Type) in acetone with zirconia grinding media followed by drying. A mixture was prepared that contained 50 grams non-milled nickel oxide powder (NiO, Novamet Standard Type), 50 grams fine NiO precursor, and 25 grams scandia-stabilized zirconia powder (ScSZ, 10 mole percent $Sc_2O_3$, 3-5 micron particle size. This mixture was ball milled in acetone with zirconia grinding media and the resulting slurry was dried to a powder. A portion of this powder was dispersed into a terpineol based ink vehicle to prepare NiO/ScSZ current carrying anode ink.

Deposition of Anode Coatings. A two-layer anode was applied to the anode face of the cobalt-doped ceria interfacial layer on the anode face of the FlexCell substrate using the electrochemically active (NiO—CoO/SDC) anode ink that was prepared as described in Example 6 and the current carrying (NiO/ScSZ) anode ink prepared above. The anode coatings were deposited and thermally treated as described in Example 6.

Deposition of Bi-Layer Cathode Coatings. Electrochemically active (LSZF/GDC/Pd) and current carrying (LSZF/Pd) cathode inks were prepared and cathode coatings were deposited onto the cobalt-doped ceria interfacial layer on the cathode face of the FlexCell substrate using the same materials, methods and thermal treatments as described in Example 6.

Figure 16:
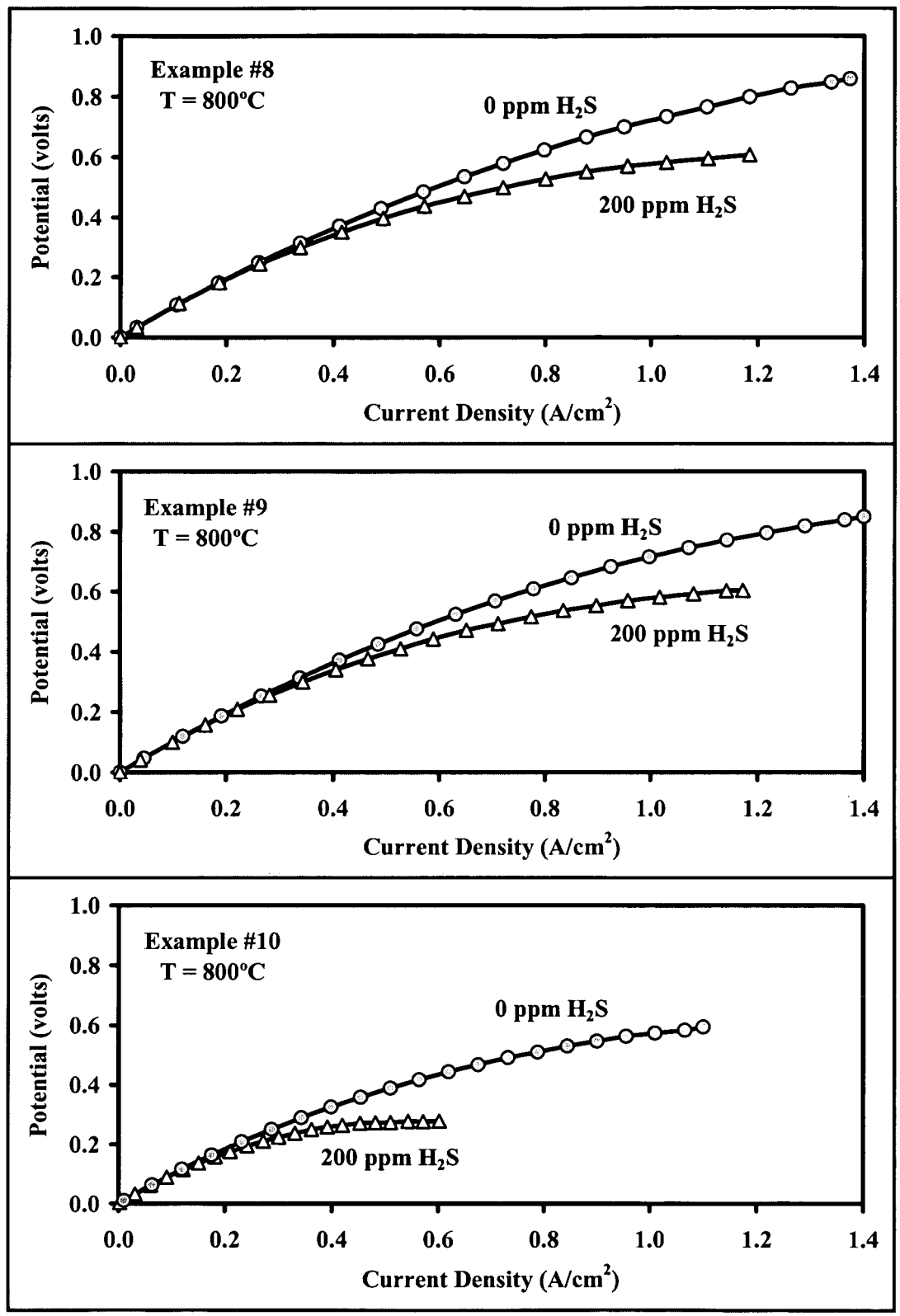
FIG. 16 is a comparison of button-cell SOFC data obtained at 800° C. for FlexCell based solid oxide fuel cells of Examples 8 (top), 9 (middle), and 10 (bottom), showing the effects of 200 ppm $H_2S$ on power density versus current density curves.

The SOFC performance of this cell with hydrogen and air as fuel and oxidant (without $H_2S$ in the fuel) was measured using button-cell testing methods. The effect of 200 ppm $H_2S$ on the SOFC performance (current density versus power density curves) at 800° C. for this cell is shown in FIG. 16. These data confirm that very high performance is obtained without $H_2S$ in the fuel and that a relatively low degradation in SOFC performance is observed when $H_2S$ is present in the fuel. The effects of varying levels of $H_2S$ (20-200 ppm) on cell voltage during constant current (0.5 A/cm$^2$) SOFC testing also is shown in FIG. 16. Based on these data, it can be concluded that this cell, which contains anode and cathode materials of the present invention, exhibits high SOFC performance and resists degradation by sulfur. However, the sulfur resistance of the cell was not as good as the cell of Example 6 because cobalt was not present in the current carrying anode layer.

Example 9

A solid oxide fuel cell was prepared from a 1.9 cm diameter disc-shaped FlexCell substrate made from ScSZ-6 electrolyte material with an active area of 0.89 cm$^2$. This cell was the same as Example 8 except that zirconia-doped ceria (ZDC) partially replaced SDC in the electrochemically active anode layer of the bi-layer anode. This cell was fabricated as described below:

Deposition of Interfacial Layer Coatings: Cobalt-doped SDC interfacial layer inks were prepared and interfacial layers were applied to both the anode and cathode faces of a FlexCell substrate using the same materials, methods and thermal treatments as described in Example 6.

Preparation of Electrochemically Active Anode Ink. NiO—CoO/SDC/ZDC anode precursor powders prepared as described in Example 3 were used to prepare electrochemically active anode inks as follows. SDC-10 and ZDC-50 powders were prepared with different surface areas. A mixture was prepared that contained 30 grams coarse NiO—CoO/ZDC/SDC precursor powder, 30 grams fine NiO—CoO/ZDC/SDC precursor powder, 17.5 grams SDC-10 powder with a surface area of 6.0 m$^2$/gram, 17.5 grams ZDC-50 powder with a surface area of 7.2 m$^2$/gram, and 5 grams SDC-10 powder with a surface area of 45 m$^2$/gram. This mixture was ball milled in acetone with zirconia grinding media and the resulting slurry was dried to a powder. A portion of this powder was dispersed into a terpineol-based ink vehicle to prepare a NiO—CoO/SDC/ZDC electrochemically active anode ink.

Deposition of Anode Coatings. A two-layer anode was applied to the anode face of the interfacial-layer-coated FlexCell using the electrochemically active (NiO—CoO/ZDC/SDC) anode ink that was prepared above and the current carrying (NiO/ScSZ) anode ink prepared as described in Example 8. The coatings were deposited and thermally treated as described in Example 6.

Deposition of Bi-Layer Cathode Coatings. Electrochemically active (LSZF/GDC/Pd) and current carrying (LSZF/Pd) cathode inks were prepared and cathode coatings were deposited onto the cobalt-doped ceria interfacial layer on the cathode face of the FlexCell substrate using the same materials, methods and thermal treatments as described in Example 6.

Figure 17:
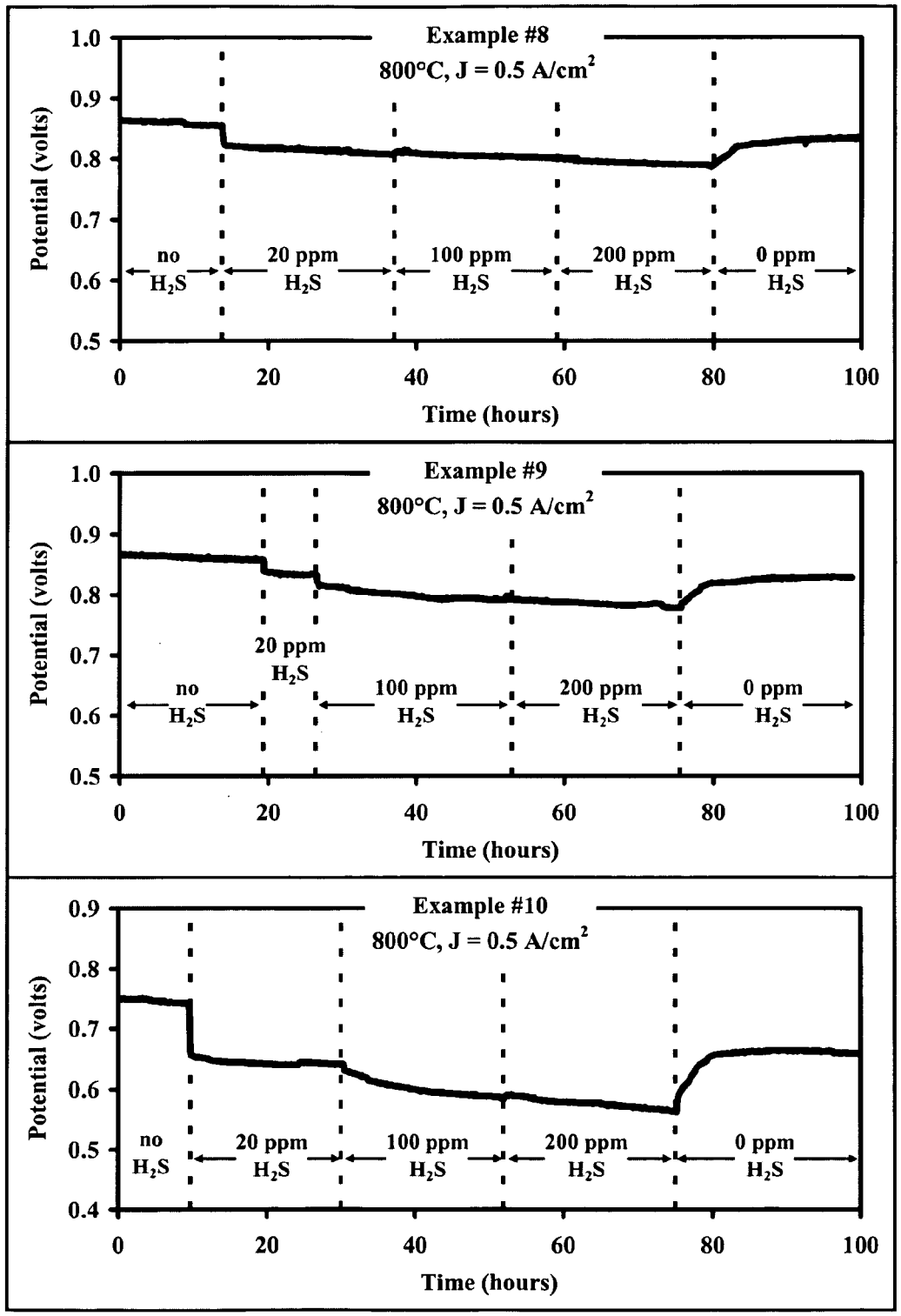
FIG. 17 is a comparison of button-cell SOFC data obtained at 800° C. for FlexCell based solid oxide fuel cells of Examples 8 (top), 9 (middle), and 10 (bottom), showing the effects of varying amounts of $H_2S$ (0-200 ppm) on voltage stability of cells operating at 800° C. with a constant current density of 0.5 $A/cm^2$.

The SOFC performance of this cell with hydrogen and air as fuel and oxidant (without $H_2S$ in the fuel) was measured using button-cell testing methods. The effect of 200 ppm $H_2S$ on the SOFC performance (current density versus power density curves) at 800° C. for this cell is shown in FIG. 16. These data confirm that very high performance is obtained without $H_2S$ in the fuel and that a relatively low degradation in SOFC performance is observed when $H_2S$ is present in the fuel. The effects of varying levels of $H_2S$ (20-200 ppm) on cell voltage during constant current (0.5 A/cm$^2$) SOFC testing is shown in FIG. 17. Based on these data, it can be concluded that this cell, which contains anode and cathode materials of the present invention, exhibits high SOFC performance and resists degradation by sulfur. However, the sulfur resistance of the cell was not as good as the cell of Example 6 (shown in FIGS. 11 and 15), because cobalt was not present in the current carrying anode layer. However, the sulfur resistance of this cell was the same as that of Example 8, which suggests that there is no detriment to replacing at least some of the SDC in the electrochemically active anode with ZDC.

Example 10

A solid oxide fuel cell was prepared from a 1.9 cm diameter disc-shaped FlexCell substrate made from ScSZ-6 electrolyte material with an active area of 0.89 cm$^2$. This cell was the same as Example 8 except that the bi-layer anode was applied directly to the anode face of the FlexCell substrate (without an anode/electrolyte interfacial layer). This cell was fabricated as described below:

Deposition of Cathode/Electrolyte/Interfacial Layer: Cobalt-doped SDC interfacial layer inks were prepared and a bi-layer interfacial layer was applied to the cathode face of a FlexCell substrate using the same materials, methods and thermal treatments as described in Example 6.

Deposition of Anode Coatings. A bi-layer anode was applied to the anode face of the non-interfacial-layer-coated FlexCell substrate using electrochemically active (NiO—CoO/SDC) anode ink that was prepared as described in Example 6 and the current carrying (NiO/ScSZ) anode ink that was prepared as described in Example 8. The coatings were deposited and thermally treated as described in Example 6.

Deposition of Bi-Layer Cathode Coatings. Electrochemically active (LSZF/GDC/Pd) and current carrying (LSZF/Pd) cathode inks were prepared and cathode coatings were deposited onto the cobalt-doped ceria interfacial layer on the cathode face of the FlexCell substrate using the same materials, methods and thermal treatments as described in Example 6.

The SOFC performance of this cell with hydrogen and air as fuel and oxidant (with and without $H_2S$ in the fuel) was measured using button-cell testing methods. Data presented in FIG. 16 suggest that the performance of this cell is not high, especially when compared to the cell of Example 8, which is identical except that the cell of Example 8 was prepared with a cobalt-doped SDC interfacial layer on the anode side. This comparison confirms the beneficial effect of the cobalt-doped SDC interfacial layer on SOFC performance. The effects of varying levels of $H_2S$ (20-200 ppm) on cell voltage during constant current (0.5 A/cm$^2$) SOFC testing is shown in FIG. 17. This cell exhibited low resistance to degradation by sulfur, especially when compared to data obtained for the cell of Example 8 (shown in FIG. 11). This comparison suggests that the cobalt-doped SDC interfacial layer is important not only for achieving high SOFC performance but also for achieving high resistance to degradation by sulfur.

Example 11

A solid oxide fuel cell was prepared from a 10×10 cm FlexCell substrate made from ScSZ-6 electrolyte material with an active area of 28 cm$^2$. This cell was fabricated with cobalt-doped SDC interfacial layers, electrochemically active (NiO—CoO/SDC) and current carrying (NiO/ScSZ) anode layers, and electrochemically active (LSZF/GDC/Pd) and current carrying (LSZF/Pd) cathode layers identical to those described in Example 6. The SOFC performance of this large-area cell was tested with hydrogen and air as fuel and oxidant (with and without 200 ppm $H_2S$ in the fuel) at temperatures of 750, 800 and 850° C. These data, shown in FIG. 12, confirm that the disclosed multilayer anode system provides the unprecedented combination of high SOFC performance and resistance to degradation by sulfur.

Example 12

A solid oxide fuel cell was prepared from a 10×10 cm FlexCell substrate made from ScSZ-6 electrolyte material with an active area of 28 cm$^2$. This cell was fabricated as described below:

Deposition of Interfacial Layer Coatings: Cobalt-doped SDC interfacial layer inks were prepared and interfacial layers were applied to both the anode and cathode faces of a FlexCell substrate using the same materials, methods and thermal treatments as described in Example 6.

Preparation of Electrochemically Active Anode Ink. Fine NiO—CoO anode precursor powder was made as described in Example 1. Gadolinium-doped ceria powder of the composition $(Ce_{0.90}Gd_{0.10})O_{1.95}$ (GDC-10) was prepared with different surface areas. A mixture was prepared that contained 30 grams non-milled nickel oxide powder (NiO, Alfa Aesar), 30 grams fine NiO—CoO precursor, 35 grams GDC-10 powder with a surface area of 6.6 m$^2$/gram, and 5 grams GDC-10 powder with a surface area of 44 m$^2$/gram. This mixture was ball milled in acetone with zirconia grinding media and the resulting slurry was dried to a powder. A portion of this powder was dispersed into a terpineol based ink vehicle to prepare a NiO—CoO/GDC electrochemically active anode ink.

Deposition of Anode Coatings. A two-layer anode was applied to the anode face of the interfacial-layer-coated FlexCell substrate using electrochemically active (NiO—CoO/GDC) anode ink prepared above and current carrying (NiO/ScSZ) anode ink as described in Example 8. The coatings were deposited and thermally treated as described in Example 6.

Preparation of Electrochemically Active Cathode Ink. The electrochemically active LSZF/GDC cathode ink was prepared in a manner identical to that described in Example 6 except that no palladium was added during preparation of the ink.

Preparation of Electrochemically Active Cathode Ink. The current carrying LSZF cathode ink was prepared in a manner identical to that described in Example 6, except that no palladium was added during preparation of the ink.

Deposition of Bi-Layer Cathode Coatings. Electrochemically active (LSZF/GDC) and current carrying (LSZF) cathode inks prepared above were deposited onto the cobalt-doped SDC interfacial layer on the cathode face of the FlexCell using the same methods and thermal treatments as described in Example 6.

Figure 18:
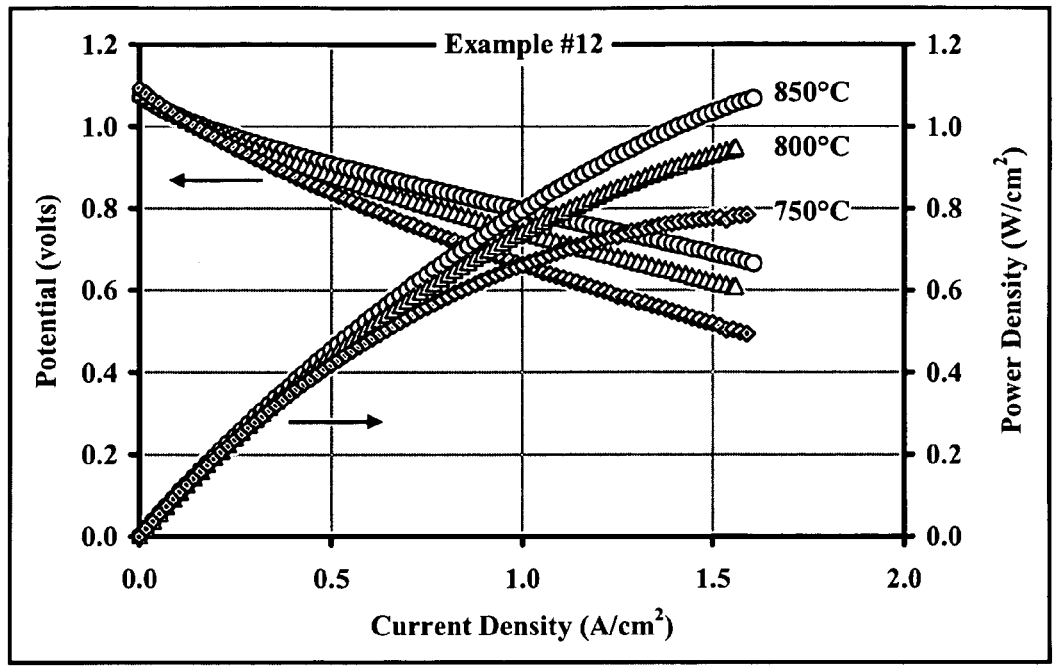
FIG. 18 is a plot of SOFC performance data (cell potential and power density versus current density) at temperatures of 750, 800 and 850° C. for the large-area FlexCell based solid oxide fuel cell of Example 12, measured under conditions of low fuel use.
Figure 19:
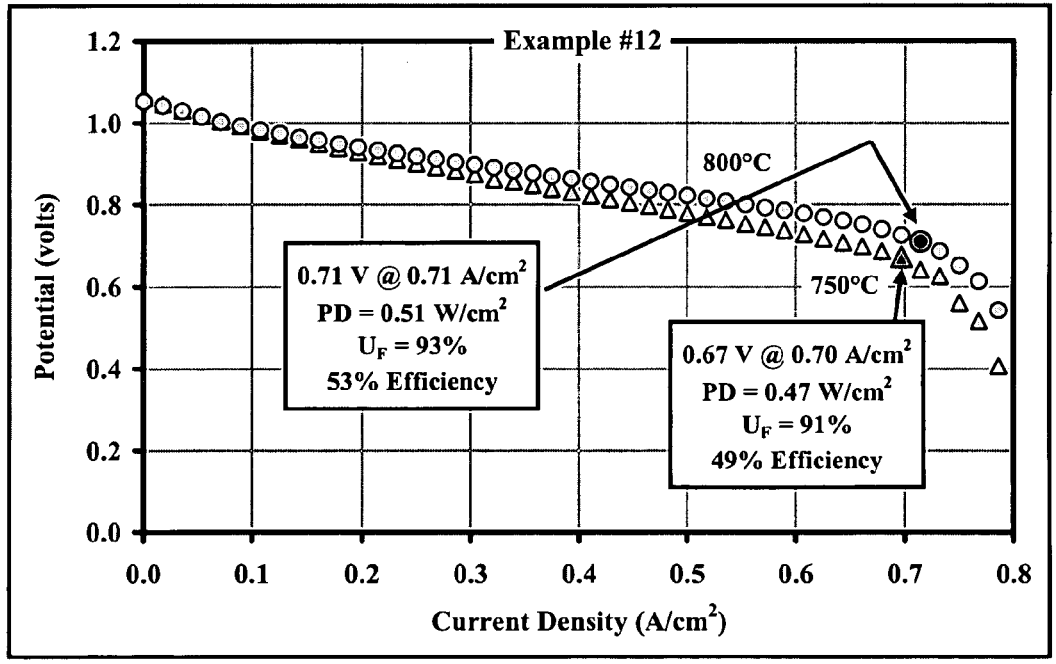
FIG. 19 is a plot of SOFC performance data (cell potential versus current density) at temperatures of 750 and 800° C. for the large-area FlexCell based solid oxide fuel cell of Example 12, measured under conditions of high fuel use.

The SOFC performance of this large-area cell was tested with hydrogen and air as fuel and oxidant at temperatures of 750, 800 and 850° C. As shown in FIG. 18, this cell exhibited very high power density under conditions of high fuel and air flow rates, equivalent to conventional anode supported cells. As shown in FIG. 19, much of the performance was retained when the cell was operated with lower fuel and air flow rates where fuel use was more than 90 percent. Electrical efficiencies of approximately 50 percent (calculated as the ratio of power output from the cell to the lower heating value of input fuel to cell) were obtained with cell power densities of approximately 0.50 W/cm$^2$ at temperatures of 750 and 800° C. These data confirm that the novel electrode materials systems of the present invention are capable of achieving high performance even when operating under high fuel use conditions.

Example 13

A solid oxide fuel cell was prepared from a 10×10 cm HybridCell substrate with an active area of 28 cm$^2$. This cell was fabricated as described below:

Deposition of Interfacial Layer Coating: Cobalt-doped SDC interfacial layer inks were prepared and a bi-layer interfacial layer was applied to the cathode face of a HybridCell substrate using the same materials, methods and thermal treatments as described in Example 6.

Deposition of Bi-Layer Cathode Coatings. Electrochemically active (LSZF/GDC/Pd) and current carrying (LSZF/Pd) cathode inks were prepared and cathode coatings were deposited onto the cobalt-doped ceria interfacial layer on the cathode face of the HybridCell using the same materials, methods and thermal treatments as described in Example 6.

The SOFC performance of this large-area cell was tested with hydrogen and air as fuel and oxidant at a temperature of 750° C., with a constant current of 0.71 A/cm$^2$ being applied and voltage being monitored for more than a year (8800 hours). As shown in FIG. 13, there was essentially no degradation observed in this cell after the first 150 hours. This is a remarkable result given that the cell was tested with manifolds made of Inconel-601, a high-chrome alloy, and degradation would be expected to occur due to chromium evaporation from the manifolds. The chromium resistance is presumed to be due to the combination of the cobalt-doped ceria interfacial layer, the use of LSZF as the ceramic electrode material constituent in the electrochemically active and current carrying cathode layers, and the use of palladium as a dopant within the cathode layers.

Example 14

A solid oxide fuel cell was prepared from a 10×10 cm FlexCell substrate made from ScSZ-6 electrolyte material with an active area of 28 cm$^2$. This cell was fabricated as described below:

Deposition of Interfacial Layer Coatings: Cobalt-doped SDC interfacial layer inks were prepared and interfacial layers were applied to both the anode and cathode faces of a FlexCell substrate using the same materials, methods and thermal treatments as described in Example 6.

Deposition of Anode Coatings. A two-layer anode was applied to the anode face of the interfacial-layer coated FlexCell using the electrochemically active (NiO—CoO/GDC) anode ink prepared as described in Example 12 and the current carrying (NiO/ScSZ) anode ink as described in Example 8. The coatings were deposited and thermally treated as described in Example 6.

Deposition of Bi-Layer Cathode Coatings. Electrochemically active (LSZF/GDC/Pd) and current carrying (LSZF/Pd) cathode inks were prepared and cathode coatings were deposited onto the cobalt-doped ceria interfacial layer on the cathode face of the FlexCell substrate using the same materials, methods and thermal treatments as described in Example 6.

Figure 20:
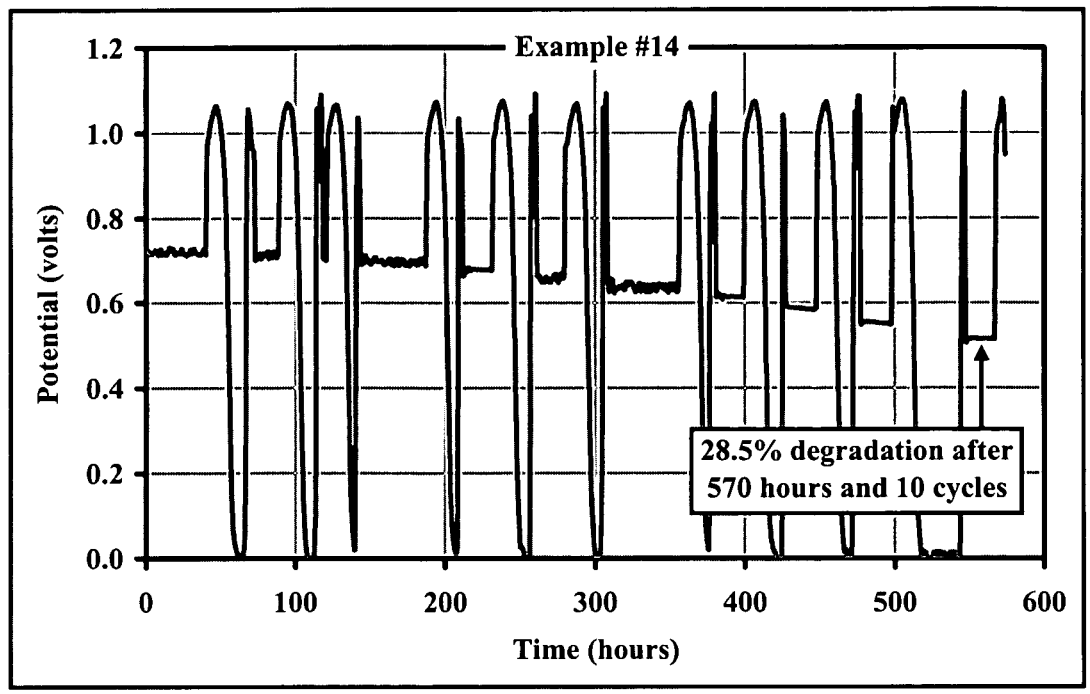
FIG. 20 is a plot of cell voltage versus time obtained during thermal cycling testing of the larger-area FlexCell-based solid oxide fuel cell of Example 14, which was prepared without nanoscale SDC in the electrochemically active layer of the anode materials system.

This large-area cell was subjected to long-term, thermal cycling testing. After the cell was reduced and its performance characteristics determined, the cell was operated at 800° C. under steady-state, constant current conditions (0.7 A/cm$^2$). Each thermal cycle involved the following: removal of the electrical load and returning the cell to open circuit conditions, purging the hydrogen fuel line with nitrogen, cooling to below 50° C. at a rate of 3° C./min with nitrogen flowing through the anode chamber and air through the cathode chamber, heating back up to 800° C. with nitrogen flowing through the anode chamber and air through the cathode chamber, re-introducing hydrogen fuel flow and returning the cell to open circuit conditions, and applying the electrical load and returning the cell to its original operating condition (0.7 A/cm$^2$). The cell was subjected to ten thermal cycles over 570 hours of testing. As shown in FIG. 20, the cell voltage degraded by a total of 28.5 percent during the test.

Example 15

A solid oxide fuel cell was prepared from a 10×10 cm FlexCell substrate made from ScSZ-6 electrolyte material with an active area of 28 cm$^2$. This cell was fabricated as described below:

Deposition of Interfacial Layer Coatings: Cobalt-doped SDC interfacial layer inks were prepared and interfacial layers were applied to both the anode and cathode faces of a FlexCell substrate using the same materials, methods and thermal treatments as described in Example 6.

Deposition of Anode Coatings. A two-layer anode was applied to the anode face of the interfacial-layer-coated FlexCell using the electrochemically active (NiO—CoO/SDC) anode ink prepared as described in Example 6 and the current carrying (NiO/ScSZ) anode ink as described in Example 8. The coatings were deposited and thermally treated as described in Example 6.

Deposition of Bi-Layer Cathode Coatings. Electrochemically active (LSZF/GDC/Pd) and current carrying (LSZF/Pd) cathode inks were prepared and cathode coatings were deposited onto the cobalt-doped ceria interfacial layer on the cathode face of the FlexCell substrate using the same materials, methods and thermal treatments as described in Example 6.

Figure 21:
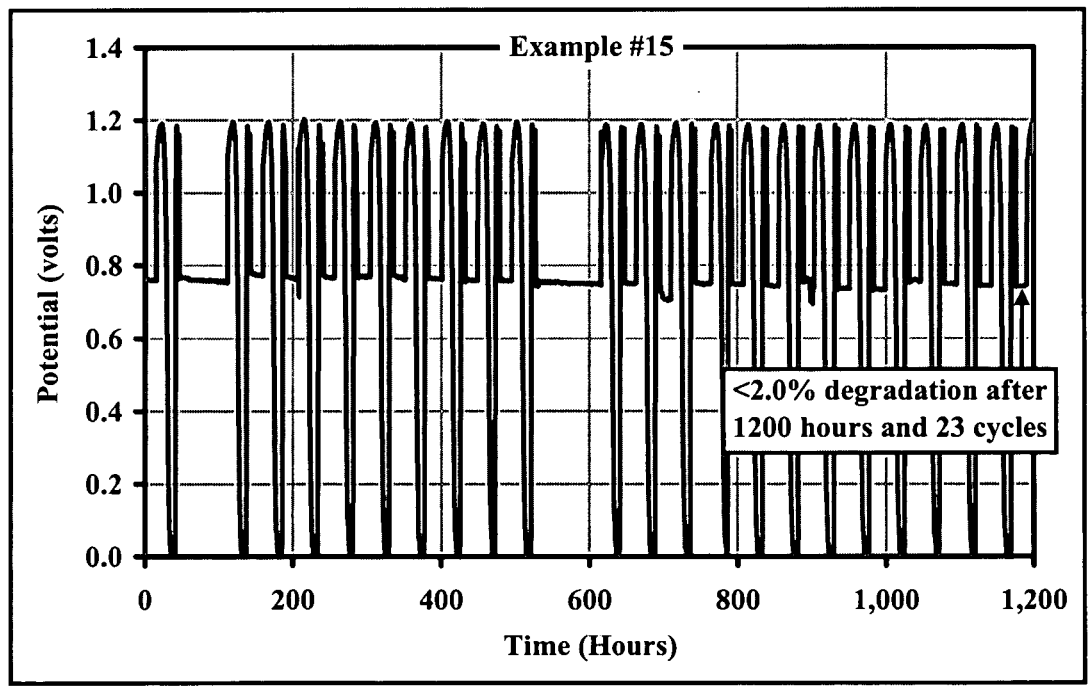
FIG. 21 is a plot of cell voltage versus time obtained during thermal cycling testing of the larger-area FlexCell-based solid oxide fuel cell of Example 15, which was prepared with nanoscale SDC in the electrochemically active layer of the anode materials system.

This large-area cell was subjected to long-term, thermal cycling testing following the protocol described in Example 14. The cell was subjected to 23 thermal cycles over 1200 hours of testing. As shown in FIG. 21, the cell voltage degraded by approximately 1.7 percent during the test. The much lower thermal cycling degradation rate observed for this cell compared to the cell of Example 14 was due to the incorporation of nanoscale SDC within the electrochemically active anode layer of the multilayer anode system.

Example 16

Figure 22:
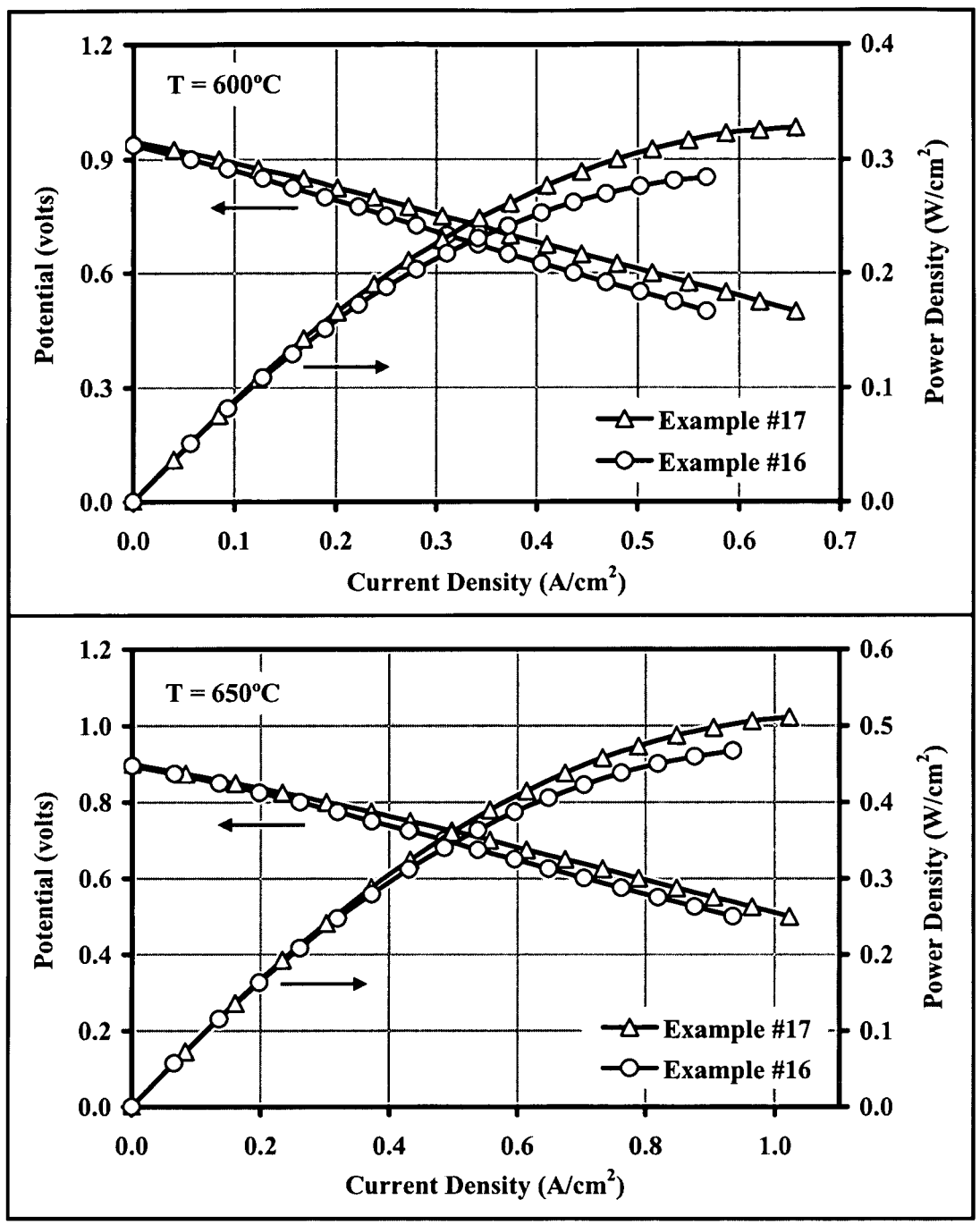
FIG. 22 is a comparison of button-cell SOFC data obtained at 600° C. (top) and 650° C. (bottom) for FlexCell-based solid oxide fuel cells of Examples 16 and 17, both with a gadolinium-doped ceria electrolyte material, showing the effects of the cobalt-doped SDC interlayer on power density versus current density curves.

A solid oxide fuel cell was prepared from a 1.9-cm diameter FlexCell substrate made from Gd-doped ceria (GDC-10, ten mole percent Gd) with an active area of 0.89 cm$^2$. A two-layer anode was applied to the anode face of the non-interfacial-layer-coated GDC FlexCell substrate using electrochemically active (NiO—CoO/SDC) anode ink prepared as described in Example 6 and current carrying (NiO/ScSZ) anode ink as described in Example 8. The anode coatings were deposited and thermally treated as described in Example 6. Cathode powder of the composition $(Sm_{0.5}Sr_{0.5})CoO_3$ (SSC) was prepared and an SSC cathode ink was prepared by dispersion of the SSC powder into a terpineol-based ink vehicle. A single-layer SSC cathode coating was deposited on the non-interfacial-layer-coated cathode face of the GDC FlexCell substrate The SOFC performance of this cell with hydrogen and air as fuel and oxidant was measured using button-cell testing methods at temperatures of 600 and 650° C. (see FIG. 22).

Example 17

A solid oxide fuel cell was prepared from a 1.9-cm diameter FlexCell substrate made from Gd-doped ceria (GDC-10, ten mole percent Gd) with an active area of 0.89 cm$^2$. Cobalt-doped SDC interfacial layer inks were prepared and interfacial layers were applied to both the anode and cathode faces of the GDC FlexCell substrate using the same materials, methods and thermal treatments as described in Example 6. A two-layer anode was applied to the anode face of the interfacial-layer-coated GDC FlexCell substrate using electro-chemically active (NiO—CoO/SDC) anode ink prepared as described in Example 6 and current carrying (NiO/ScSZ) anode ink as described in Example 8. The anode coatings were deposited and thermally treated as described in Example 6. A single-layer SSC cathode coating was applied to the cathode face of FlexCell substrate as described in Example 16. The SOFC performance of this cell with hydrogen and air as fuel and oxidant was measured using button-cell testing methods at temperatures of 600 and 650° C. (see FIG. 22). As shown by these data, the incorporation of the two-layer, cobalt-doped SDC interfacial layer led to a significant improvement in SOFC performance at these low operating temperatures. This improvement is presumed to be due to an increase of triple-phase boundary area at the electrolyte/cathode and electrolyte/anode interfaces that was provided by the bi-layer cobalt-doped SDC interfacial layer (i.e., the porous and textured nature of the second layer of the cobalt-doped ceria bi-layer interfacial layer).

The SOFC anode materials systems of the present invention are applicable to planar solid oxide fuel cells of electrolyte supported configurations as well as other planar solid oxide fuel cells including anode-supported and cathode supported types. These anode materials systems also are applicable to non-planar solid oxide fuel cell designs including cathode supported tubular designs, electrolyte supported tubular designs, and hybrid designs such as segmented-in-series designs. The SOFC cathode materials systems of the present invention are applicable to planar solid oxide fuel cells of electrolyte supported and anode supported configurations, and also can be adapted for other planar solid oxide fuel cells, including cathode supported designs. These cathode materials systems also are applicable to non-planar solid oxide fuel cell designs, such as anode supported tubular designs, electrolyte supported tubular designs, and hybrid designs such as segmented-in-series designs. The electrode materials systems of the present invention also may be adapted to other types of electrochemical systems, including solid oxide electrolysis systems for producing hydrogen and/or oxygen, reversible solid oxide fuel cell systems that cycle between power generation and reactant (hydrogen and oxygen) production, ceramic oxygen generation systems for separating oxygen from air, and ceramic membrane reactors for producing hydrogen and/or other chemicals from hydrocarbon feedstocks.

Several materials and processes are disclosed herein that allow the fabrication of planar solid oxide fuel cells with high electrochemical performance and exceptional long-term durability. Although many of the materials and processes were described with reference to planar solid oxide fuel cells based on the FlexCell and HybridCell structures, these same materials and components have utility in other types of planar solid oxide fuel cells and other electrochemical systems based on planar stacks of electrochemical cells. Moreover, many of the disclosed material solutions can be applied to non-planar electrochemical cell configurations, such as tubular and flat-tubular cell designs of cathode-supported, anode supported and electrolyte supported configurations.

The preferred embodiment of this invention can be achieved by many techniques and methods known to persons who are skilled in this field. To those skilled and knowledgeable in the arts to which the present invention pertains, many widely differing embodiments will be suggested by the foregoing without departing from the intent and scope of the present invention. The descriptions and disclosures herein are intended solely for purposes of illustration and should not be construed as limiting the scope of the present invention which is described by the following claims.

What is claimed is:

1. An anode system for a solid oxide fuel cell for use with sulfur-containing fuel streams, the anode comprising:
   a first anode/electrolyte interfacial layer comprising a thin dense ceria layer on an electrolyte membrane;
   a second anode/electrolyte interfacial layer comprising a porous ceria layer on the first anode/electrolyte interfacial layer;
   a first cermet anode layer on the second anode/electrolyte interfacial layer, the metallic component of the first cermet comprising at least one of nickel, an alloy containing nickel and cobalt, and a mixture of nickel and cobalt compositions, and the ceramic component of the first cermet comprising a doped ceria electrolyte material; and
   a second cermet anode layer on the first cermet anode layer, the metallic component of the second cermet comprising at least one of nickel, an alloy containing nickel and cobalt, and a mixture of nickel and cobalt compositions, the ceramic component of the second cermet comprising a ceramic electrolyte material, and the cermet having a coarser microstructure and a higher metal content than the first cermet layer;

wherein said first and second cermet anode layers comprise 20 to 80 percent by weight of ceramic component.

2. The anode system of claim 1, wherein at least one of the anode/electrolyte interfacial layers comprises a doped ceria electrolyte material.

3. The anode system of claim 1, wherein at least one of the anode/electrolyte interfacial layers comprises a ceria electrolyte material doped with cobalt.

4. The anode system of claim 1, further comprising nanoscale particles of a ceramic material resident within the grains of the metallic component of at least one of the cermet layers, the nanoscale ceramic material being selected from a doped ceria electrolyte material, a doped zirconia electrolyte material, and combinations thereof.

5. A solid oxide fuel cell for use with a sulfur-containing fuel stream, the solid oxide fuel cell comprising:
a ceramic electrolyte membrane;
a bi-layer anode/electrolyte interfacial layer on one face of the ceramic electrolyte membrane, the interfacial layer comprising a first dense layer on the electrolyte membrane and a second porous layer on the first dense layer;
an anode applied to the second porous layer of the bi-layer anode/electrolyte interfacial layer, wherein said anode has a different composition than said bi-layer anode/electrolyte interfacial layer, and further wherein the anode comprises a first anode layer on the porous interfacial layer and a second anode layer on the first anode layer,
the first anode layer comprising a cermet in which the metallic component comprises at least one of nickel, an alloy containing nickel and cobalt, and a mixture of nickel and cobalt compositions, and the ceramic component is a ceria-based electrolyte material, and having a fine-scale microstructure, and
the second anode layer comprising a cermet in which the metallic component comprises at least one of nickel, an alloy containing nickel and cobalt, and a mixture of nickel and cobalt compositions, and a ceramic component comprising a ceramic electrolyte material, and having a coarser microstructure and a higher nickel content than the first anode layer;
and
a cathode applied to the opposite face of the ceramic electrolyte membrane.

6. The solid oxide fuel cell of claim 5 further comprising nanoscale particles of a ceramic electrolyte material resident within the grains of the metallic component of at least one of the cermet anode layers, the nanoscale electrolyte material being selected from a doped zirconia material, a doped ceria material, and combinations thereof.

7. The solid oxide fuel cell of claim 5, wherein said bi-layer anode/electrolyte interfacial comprises a first dense ceria layer on the electrolyte membrane and a second porous ceria layer on the dense ceria layer, and further wherein the metallic component of the first anode layer comprises at least one of an alloy containing nickel and cobalt and a mixture of nickel and cobalt compositions, and the ceramic component of the first anode layer comprises a mixed conducting ceria-based electrolyte material.

8. The solid oxide fuel cell of claim 5, further comprising an electrolyte/cathode interfacial layer comprising a first thin dense ceria layer on the opposing side of the ceramic electrolyte membrane and a second thin porous ceria layer on the thin dense ceria layer; and
said cathode comprises a first cathode layer on the porous electrolyte/cathode interfacial layer and a second cathode layer on the first cathode layer, the first cathode layer comprising a composite of a mixed conducting ceria-based electrolyte material and a ceramic electrode material and having a fine microstructure and small-scale porosity, and the second cathode layer comprising a single phase ceramic electrode material and having a coarser microstructure and larger scale porosity than the first cathode layer.

9. The solid oxide fuel cell of claim 5, wherein at least one of the electrolyte/anode interfacial layers is doped with cobalt.

10. The solid oxide fuel cell of claim 8, wherein at least one of the electrolyte/cathode interfacial layers is doped with cobalt and the composite material of the first cathode layer further comprises a palladium dopant in an amount sufficient to provide resistance to chromium poisoning during operation of the solid oxide fuel cell.

11. The anode system of claim 1, wherein the metallic component of at least one of the cermet anode layers comprises an alloy of nickel and cobalt.

* * * * *